US009189924B2

(12) United States Patent
Hoffman et al.

(10) Patent No.: US 9,189,924 B2
(45) **Date of Patent: *Nov. 17, 2015**

(54) GAMING SYSTEM AND METHOD FOR PROVIDING A BONUS EVENT TRIGGERED BY A CONTINUOUS COMMUNAL GAME

(71) Applicant: IGT, Las Vegas, NV (US)

(72) Inventors: Benjamin C. Hoffman, Reno, NV (US); Paulina Rodgers, Reno, NV (US); Christmas C. Parker, Reno, NV (US)

(73) Assignee: IGT, Las Vegas, NV (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/946,645

(22) Filed: Jul. 19, 2013

(65) Prior Publication Data

US 2013/0310146 A1 Nov. 21, 2013

Related U.S. Application Data

(63) Continuation of application No. 12/182,667, filed on Jul. 30, 2008, now Pat. No. 8,496,519.

(51) Int. Cl.
*A63F 13/00* (2014.01)
*G07F 17/32* (2006.01)

(52) U.S. Cl.
CPC ............ *G07F 17/3267* (2013.01); *G07F 17/32* (2013.01); *G07F 17/3244* (2013.01)

(58) Field of Classification Search
CPC .. G07F 17/32; G07F 17/3244; G07F 17/3267
USPC .......................................... 463/16–20, 40–42
See application file for complete search history.

(56) References Cited

U.S. PATENT DOCUMENTS

| | | | |
|---|---|---|---|
| 4,624,459 | A | 11/1986 | Kaufman |
| 4,695,053 | A | 9/1987 | Vazquez, Jr. et al. |
| 4,775,155 | A | 10/1988 | Lees |
| 4,837,728 | A | 6/1989 | Barrie et al. |
| 4,852,885 | A | 8/1989 | Baratpour et al. |
| 4,991,848 | A | 2/1991 | Greenwood et al. |
| 5,092,598 | A | 3/1992 | Kamille |

(Continued)

FOREIGN PATENT DOCUMENTS

| | | |
|---|---|---|
| EP | 0 449 433 | 10/1991 |
| EP | 0 688 002 A1 | 12/1995 |

(Continued)

*Primary Examiner* — Ronald Laneau
*Assistant Examiner* — Ross Williams
(74) *Attorney, Agent, or Firm* — Neal, Gerber & Eisenberg LLP

(57) ABSTRACT

A communal game is displayed by a gaming system. A plurality of gaming devices each enable a player to wager on plays of a primary game and determine an eligibility status. The communal game repeatedly generates at least one communal game symbol from a plurality of communal game symbols regardless of whether any player is wagering on plays of a primary game. The communal game triggers a bonus event based on the generated symbols. Any eligible gaming devices may participate in the bonus event. For each eligible gaming device, the gaming system applies at least one symbol or gaming element from the communal game to the primary game of the eligible gaming device. Each eligible gaming device provides an award based on any winning symbol combinations generated by application of the communal game symbol or gaming element.

18 Claims, 13 Drawing Sheets

(56) References Cited

U.S. PATENT DOCUMENTS 5,178,390 A 1/1993 Okada
5,205,555 A 4/1993 Hamano
5,324,041 A 6/1994 Boylan et al.
5,342,047 A 8/1994 Heidel et al.
5,374,067 A 12/1994 Jones
5,393,057 A 2/1995 Marnell, II
5,411,271 A 5/1995 Mirando
5,449,173 A 9/1995 Thomas et al.
5,456,465 A 10/1995 Durham
5,472,196 A 12/1995 Rusnak
5,536,016 A 7/1996 Thompson
5,560,603 A 10/1996 Seelig et al.
5,611,730 A 3/1997 Weiss
5,639,089 A 6/1997 Matsumoto et al.
5,645,486 A 7/1997 Nagao et al.
5,664,998 A 9/1997 Seelig et al.
5,755,619 A 5/1998 Matsumoto et al.
5,769,716 A 6/1998 Saffari et al.
5,772,506 A 6/1998 Marks et al.
5,779,544 A 7/1998 Seelig et al.
5,788,573 A 8/1998 Baerlocher et al.
5,823,874 A 10/1998 Adams
5,833,536 A 11/1998 Davids et al.
5,833,537 A 11/1998 Barrie
5,848,932 A 12/1998 Adams
5,851,148 A 12/1998 Brune et al.
5,855,514 A 1/1999 Kamille
5,873,781 A 2/1999 Keane
5,882,261 A 3/1999 Adams
5,909,875 A 6/1999 Weingardt
5,927,714 A 7/1999 Kaplan
5,935,002 A 8/1999 Falciglia
5,947,820 A 9/1999 Morro et al.
5,951,012 A 9/1999 Feola
5,964,463 A 10/1999 Moore, Jr.
5,976,015 A 11/1999 Seelig et al.
5,980,384 A 11/1999 Barrie
5,984,781 A 11/1999 Sunaga
5,997,400 A 12/1999 Seelig et al.
5,997,401 A 12/1999 Crawford
6,004,207 A 12/1999 Wilson, Jr. et al.
6,012,982 A 1/2000 Piechowiak et al.
6,015,344 A 1/2000 Kelly et al.
6,015,346 A 1/2000 Bennett
6,019,369 A 2/2000 Nakagawa et al.
6,033,307 A 3/2000 Vancura
6,059,289 A 5/2000 Vancura
6,059,658 A 5/2000 Mangano et al.
6,089,976 A 7/2000 Schneider et al.
6,089,977 A 7/2000 Bennett
6,089,978 A 7/2000 Adams
6,093,102 A 7/2000 Bennett
6,102,400 A 8/2000 Scott et al.
6,102,798 A 8/2000 Bennett
6,117,009 A 9/2000 Yoseloff
6,120,031 A 9/2000 Adams
6,120,377 A 9/2000 McGinnis, Sr. et al.
6,126,542 A 10/2000 Fier
6,126,547 A 10/2000 Ishimoto
6,135,884 A 10/2000 Hedrick et al.
6,135,885 A 10/2000 Lermusiaux
6,142,873 A 11/2000 Weiss et al.
6,149,521 A 11/2000 Sanduski
6,155,925 A 12/2000 Giobbi et al.
6,159,095 A 12/2000 Frohm et al.
6,159,097 A 12/2000 Gura
6,159,098 A 12/2000 Slomiany et al.
6,162,121 A 12/2000 Morro et al.
6,164,652 A 12/2000 Lauretta et al.
6,168,520 B1 1/2001 Baerlocher et al.
6,168,523 B1 1/2001 Piechowiak et al.
6,173,955 B1 1/2001 Perrie et al.
6,174,235 B1 1/2001 Walker et al.
6,186,894 B1 2/2001 Mayeroff
6,190,255 B1 2/2001 Thomas et al.
6,203,429 B1 3/2001 Demar et al.
6,217,448 B1 4/2001 Olsen
6,231,445 B1 5/2001 Acres
6,261,177 B1 7/2001 Bennett
6,270,409 B1 8/2001 Shuster
6,290,600 B1 9/2001 Glasson
6,299,165 B1 10/2001 Nagano
6,309,300 B1 10/2001 Glavich
6,312,334 B1 11/2001 Yoseloff
6,315,660 B1 11/2001 DeMar et al.
6,315,664 B1 11/2001 Baerlocher et al.
6,328,649 B1 12/2001 Randall et al.
6,346,043 B1 2/2002 Colin et al.
6,416,409 B1 7/2002 Jordan
6,446,972 B1 9/2002 Brunelle
6,461,241 B1 10/2002 Webb et al.
6,533,273 B2 3/2003 Cole et al.
6,581,936 B1 6/2003 Zoccolillo et al.
6,612,574 B1 9/2003 Cole et al.
6,612,575 B1 9/2003 Cole et al.
6,632,139 B1 10/2003 Baerlocher
6,638,164 B2 10/2003 Randall et al.
6,656,048 B2 12/2003 Olsen
6,682,419 B2 1/2004 Webb et al.
6,682,420 B2 1/2004 Webb et al.
6,688,977 B1 2/2004 Baerlocher et al.
6,733,389 B2 5/2004 Webb et al.
6,755,737 B2 6/2004 Jackson et al.
6,758,747 B2 7/2004 Baerlocher
6,769,983 B2 8/2004 Slomiany
6,780,111 B2 8/2004 Cannon et al.
6,786,819 B2 9/2004 Baerlocher et al.
6,793,578 B2 9/2004 Luccesi et al.
6,860,811 B1 3/2005 Wilkins
6,887,154 B1 5/2005 Luciano, Jr. et al.
6,939,228 B2 9/2005 Shimizu
6,964,416 B2 11/2005 McClintic et al.
6,971,954 B2 12/2005 Randall et al.
6,981,917 B2 1/2006 Webb et al.
7,004,466 B2 2/2006 Gauselmann
7,011,581 B2 3/2006 Cole et al.
7,070,502 B1 7/2006 Bussick et al.
7,121,942 B2 10/2006 Baerlocher
7,131,647 B1 11/2006 Bachlor
7,144,321 B2 12/2006 Mayeroff
7,160,190 B2 1/2007 Baerlocher et al.
7,169,046 B2 1/2007 Webb et al.
7,198,570 B2 4/2007 Rodgers et al.
7,226,359 B2 6/2007 Bussick et al.
7,258,611 B2 8/2007 Bigelow, Jr. et al.
7,311,598 B2 12/2007 Kaminkow et al.
7,311,604 B2 12/2007 Kaminkow et al.
7,331,865 B2 2/2008 Baerlocher et al.
7,351,140 B2 4/2008 Wolf et al.
7,393,280 B2 7/2008 Cannon
7,413,510 B2 8/2008 Schlegel et al.
7,481,709 B2 1/2009 Bussick et al.
8,496,519 B2 * 7/2013 Hoffman et al. ................ 463/20
2001/0004607 A1 6/2001 Olsen
2001/0009865 A1 7/2001 DeMar et al.
2002/0180152 A1 12/2002 Gauselmann
2003/0001335 A1 1/2003 Vancura et al.
2003/0054871 A1 3/2003 Baerlocher
2003/0060259 A1 3/2003 Mierau et al.
2003/0064796 A1 4/2003 Glavich et al.
2003/0064797 A1 4/2003 Jackson et al.
2003/0069062 A1 4/2003 Shimizu
2003/0119580 A1 6/2003 McClintic et al.
2003/0153378 A1 8/2003 Schlegel et al.
2003/0162585 A1 8/2003 Bigelow et al.
2003/0186733 A1 10/2003 Wolf et al.
2004/0002372 A1 1/2004 Rodgers et al.
2004/0033831 A1 2/2004 Tarantino
2004/0043815 A1 3/2004 Kaminkow
2004/0082373 A1 4/2004 Cole et al.
2004/0102243 A1 5/2004 Olsen
2004/0204235 A1 10/2004 Walker et al.
2004/0248639 A1 12/2004 Slomiany
2004/0266510 A1 12/2004 Kojima

(56) References Cited

U.S. PATENT DOCUMENTS

| | | | |
|---|---|---|---|
| 2005/0009601 | A1 | 1/2005 | Manfredi et al. |
| 2005/0026679 | A1 | 2/2005 | Lucchesi et al. |
| 2005/0032566 | A1 | 2/2005 | Baerlocher et al. |
| 2005/0054435 | A1 | 3/2005 | Rodgers et al. |
| 2005/0070353 | A1 | 3/2005 | Webb et al. |
| 2005/0096114 | A1 | 5/2005 | Cannon et al. |
| 2005/0107154 | A1 | 5/2005 | Pacey |
| 2005/0119042 | A1 | 6/2005 | Chamberlain et al. |
| 2005/0153767 | A1 | 7/2005 | Gauselmann |
| 2005/0181860 | A1 | 8/2005 | Nguyen et al. |
| 2006/0025195 | A1 | 2/2006 | Pennington et al. |
| 2006/0040723 | A1 | 2/2006 | Baerlocher et al. |
| 2006/0040732 | A1 | 2/2006 | Baerlocher et al. |
| 2006/0040733 | A1 | 2/2006 | Baerlocher et al. |
| 2006/0040734 | A1 | 2/2006 | Baerlocher et al. |
| 2006/0040736 | A1 | 2/2006 | Baerlocher et al. |
| 2006/0046822 | A1 | 3/2006 | Kaminkow et al. |
| 2006/0073878 | A1 | 4/2006 | Shackelford et al. |
| 2006/0094494 | A1 | 5/2006 | O'Halloran et al. |
| 2006/0121971 | A1 | 6/2006 | Slomiany et al. |
| 2006/0142077 | A1 | 6/2006 | Miles et al. |
| 2006/0160603 | A1 | 7/2006 | Lulek |
| 2006/0205517 | A1 | 9/2006 | Malabuyo et al. |
| 2006/0217183 | A1 | 9/2006 | Mierau et al. |
| 2006/0247003 | A1 | 11/2006 | Macke |
| 2006/0287037 | A1 | 12/2006 | Thomas |
| 2006/0287043 | A1 | 12/2006 | Englman et al. |
| 2007/0054732 | A1 | 3/2007 | Baerlocher |
| 2007/0054733 | A1 | 3/2007 | Baerlocher |
| 2007/0060247 | A1 | 3/2007 | Low et al. |
| 2007/0072665 | A1 | 3/2007 | Muir |
| 2007/0077990 | A1 | 4/2007 | Cuddy et al. |
| 2007/0087811 | A1 | 4/2007 | Mayeroff |
| 2007/0155474 | A1 | 7/2007 | Gauselmann |
| 2007/0155485 | A1 | 7/2007 | Cuddy et al. |
| 2007/0167211 | A1 | 7/2007 | Rodgers et al. |
| 2007/0167217 | A1 | 7/2007 | Kaminkow et al. |
| 2007/0167238 | A1 | 7/2007 | Gatto et al. |
| 2007/0173313 | A1 | 7/2007 | Bienvenue |
| 2007/0281778 | A1 | 12/2007 | Bigelow et al. |
| 2008/0020817 | A1 | 1/2008 | Kaminkow et al. |
| 2008/0020822 | A1 | 1/2008 | Cuddy et al. |
| 2008/0020823 | A1 | 1/2008 | Cuddy et al. |
| 2008/0020824 | A1 | 1/2008 | Cuddy et al. |
| 2008/0020825 | A1 | 1/2008 | Cuddy et al. |
| 2008/0020829 | A1 | 1/2008 | Baerlocher |
| 2008/0020842 | A1 | 1/2008 | Kaminkow et al. |
| 2008/0020847 | A1 | 1/2008 | Kniesteadt et al. |
| 2008/0051168 | A1 | 2/2008 | Kaminkow et al. |
| 2008/0070676 | A1 | 3/2008 | Baerlocher et al. |
| 2008/0070677 | A1 | 3/2008 | Baerlocher et al. |
| 2008/0070678 | A1 | 3/2008 | Baerlocher et al. |
| 2008/0070702 | A1 | 3/2008 | Kaminkow et al. |
| 2008/0081690 | A1 | 4/2008 | Baerlocher et al. |
| 2008/0081691 | A1 | 4/2008 | Baerlocher et al. |
| 2008/0102916 | A1 | 5/2008 | Kovacs et al. |
| 2008/0102920 | A1 | 5/2008 | Baerlocher |
| 2008/0102927 | A1 | 5/2008 | Mayeroff |
| 2008/0108401 | A1 | 5/2008 | Baerlocher et al. |
| 2008/0108429 | A1 | 5/2008 | Davis et al. |
| 2008/0108431 | A1 | 5/2008 | Cuddy et al. |
| 2008/0113765 | A1 | 5/2008 | DeWaal |
| 2008/0113768 | A1 | 5/2008 | Baerlocher |
| 2008/0113771 | A1 | 5/2008 | Baerlocher et al. |
| 2008/0139274 | A1 | 6/2008 | Baerlocher |
| 2008/0139290 | A1 | 6/2008 | Kniesteadt et al. |
| 2008/0148542 | A1 | 6/2008 | Mayeroff |
| 2008/0149292 | A1 | 6/2008 | Scherb |
| 2008/0153564 | A1 | 6/2008 | Baerlocher et al. |
| 2008/0155654 | A1 | 6/2008 | Ross et al. |
| 2008/0176650 | A1 | 7/2008 | Wolf et al. |
| 2008/0188287 | A1 | 8/2008 | Schlegel et al. |
| 2008/0268946 | A1 | 10/2008 | Roemer |
| 2009/0017906 | A1 | 1/2009 | Jackson |
| 2009/0042644 | A1 | 2/2009 | Zielinski |

FOREIGN PATENT DOCUMENTS

| | | | |
|---|---|---|---|
| EP | 0 874 337 | A1 | 10/1998 |
| EP | 0 926 645 | A2 | 6/1999 |
| EP | 0 944 030 | A2 | 9/1999 |
| EP | 0 945 837 | | 9/1999 |
| GB | 2 144 644 | | 3/1985 |
| GB | 2 191 030 | | 12/1987 |
| GB | 2 222 712 | | 3/1990 |
| GB | 2 322 217 | | 8/1998 |
| GB | 2 328 311 | | 2/1999 |
| GB | 2 333 880 | | 8/1999 |
| GB | 2 353 128 | | 2/2001 |
| WO | WO 97/32285 | | 9/1997 |
| WO | WO 00/12186 | | 3/2000 |
| WO | WO 03/049053 | | 6/2003 |
| WO | WO/2006/124441 | | 11/2006 |
| WO | WO/2007/030552 | | 3/2007 |
| WO | WO/2007/030733 | | 3/2007 |
| WO | WO/2008/048634 | | 4/2008 |

* cited by examiner

No bonus event is triggered for a "6x" symbol indicated by the Communal Game Bonus Event Indicator.

A bonus event is triggered for a "Cherry" symbol indicated by the Communal Game Bonus Event Indicator! Eligible player prepare to insert indicated symbols.

GAMING SYSTEM AND METHOD FOR PROVIDING A BONUS EVENT TRIGGERED BY A CONTINUOUS COMMUNAL GAME

PRIORITY CLAIM

This application is a continuation of, claims priority to and the benefit of U.S. patent application Ser. No. 12/182,667, filed on Jul. 30, 2008, the entire contents of which is incorporated by reference herein.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known gaming machines are configured such that the players of these gaming machines compete for one or more awards such as progressive awards. Such progressive awards are typically displayed by one or more secondary display devices above the bank or group of gaming machines. Other known gaming machines or gaming systems are configured such that the players share with each other or can each win one or more awards. These awards are sometimes displayed by one or more secondary display devices above the bank or group of gaming machines. These types of group or community gaming systems (where the players are either competing for awards, where the players are sharing awards, or where the players are winning awards at the same time) are growing in popularity. Certain of these group or community gaming systems create an aura of excitement and entertainment for the people playing the gaming machines of the system and for people watching play.

There is a continuing need to increase this excitement and entertainment for people playing and people watching play of group or community gaming systems. There is also need for new ways of providing better gaming experiences and environments at gaming machines. There is a further need for increasing social interactivity among people playing and people watching play of gaming machines which are or are not part of a group or community gaming system.

SUMMARY

The present disclosure relates generally to gaming systems and methods which provide a bonus event for a plurality of players based on a triggering event occurring in a communal game. More specifically, the present disclosure relates to a gaming system providing a group or communal game configured to repeatedly generate and display at least one symbol or gaming element from a plurality of communal game symbols or gaming elements. The gaming system repeatedly and continuously generates and displays symbols or gaming elements for the communal game, regardless of whether any player is playing any of a plurality of primary games of the individual gaming devices of the gaming system. These repeated plays of the communal game continue until a bonus event is triggered. When a bonus event is triggered, any eligible gaming devices participate in a bonus event and are provided an opportunity to win a bonus award. In one embodiment, one or more eligible player's award in the bonus event is based on one or more communal gaming symbols or elements generated in the communal game. For instance, the gaming system may provide a bonus award to a player based on a winning combination of symbols resulting from a combination of one or more primary game symbols with one or more communal game symbols.

More specifically, in one embodiment, the gaming system disclosed herein includes a community display, a central controller, and a plurality of gaming devices. Regardless of the state of any of the plurality of gaming devices (i.e., regardless of whether a player is playing the primary game of any of the gaming devices), the gaming system is configured to repeatedly play a communal game by generating and displaying one or more symbols or gaming elements from a plurality of communal gaming symbols. That is, independent of any gaming activity that may or may not be occurring on the gaming devices, the gaming system repeatedly plays a group or communal game. In one embodiment, the gaming system repeatedly generates and displays a new symbol in each of the plurality of communal game symbol positions based on a communal game repeat event, such as an amount of time that passes between plays of the communal game. In one embodiment, based on the symbols generated for each play of the communal game, the gaming system may trigger a bonus event in which any eligible gaming device may participate to win one or more awards. In one such embodiment, each play of the communal game thus represents an opportunity for any eligible gaming device of the disclosed gaming system to participate in a bonus event wherein one or more gaming elements from the communal game are integrated in the primary game of the gaming device.

In one embodiment, the gaming system triggers a bonus event if one or more designated communal game symbols are generated for a play of the communal game. In one embodiment, the gaming system displays a symbol from a plurality of communal game symbols in each of a plurality of symbol positions. In this embodiment, the gaming system triggers a bonus event if the displayed symbols for a play of the communal game include one or more designated symbols. In different embodiments, the gaming system triggers a bonus event if the displayed symbols for a play of the communal game form one or more designated symbol combinations.

In one example embodiment, the communal game is a slot or reel game including a plurality of reels, each reel having a plurality of symbol positions. In another embodiment, the communal game is a wheel game including a plurality of symbols and at least one symbol indicator. In various other embodiments, the communal game is any suitable game having a plurality of gaming elements.

In various embodiments, the gaming system enables one or more eligible gaming devices to participate in a triggered bonus event. In one embodiment, each gaming device determines that gaming device's bonus event eligibility based on one or more plays of a primary game. In another embodiment, the gaming system determines, for one or more gaming devices, eligibility for a bonus event based on a wager on a play of the primary game. In another embodiment, the gaming system determines, for one or more gaming devices, eligibility based on an outcome of a play of a primary game such as the generation and display of a winning symbol combination. In various embodiments, a player's or gaming device's eligibility status is based on a side wager on a play of the communal game, a designated outcome of a primary game, randomly, on player status or ranking, on an amount of coin-in, on a time of day, or on a number of players wagering on plays of a plurality of primary games of a bank of gaming devices.

The bonus event in one embodiment includes the incorporation of one or more symbols or gaming elements from the communal game into the primary game of each gaming device eligible at the time a bonus event is triggered. In one embodiment, this incorporation is accomplished by inserting, modifying, transferring, or otherwise applying one or more of the symbols generated for a play of the communal game to the symbols generated for a play of the primary game. For example, in one embodiment, the gaming system inserts one or more of the symbols generated for a play of the communal game in one or more of the symbol positions of the primary game of an eligible gaming device. In one embodiment, the gaming system re-evaluates the plurality of symbols displayed for the play of the primary game of a gaming device, including any inserted symbols, to determine any winning symbol combinations for the bonus event. The gaming system provides an award for each of any newly-generated winning symbol combinations.

In one embodiment, the particular triggering event of the communal game impacts the way in which symbols or gaming elements from the communal game are incorporated in eligible primary games. In one such embodiment, a communal game triggers a bonus event by generating a designated symbol. In this embodiment, for each additional designated symbol generated for the play of the communal game, the gaming system replaces at least one additional symbol or gaming element and provides an award for any resulting winning symbol combinations for a plurality of award determinations. In one such embodiment, for each symbol or gaming element incorporated in the primary game, the gaming system provides an award for any resulting winning symbol combination before incorporating the next of any remaining communal symbols or gaming elements.

In one embodiment, the plurality of communal game symbols includes symbols configured to be more likely to generate winning symbol combinations or to generate more valuable winning symbol combinations upon incorporation in a primary game. For example, in one embodiment the plurality of communal game symbols includes at least one Wild symbol. In this embodiment, the reels of the primary games of the plurality of gaming devices do not include any Wild symbols (or include fewer Wild symbols than the communal game). Thus, for a play of the primary game of such gaming devices, a Wild symbol cannot be generated (or the probability of generating a Wild symbol is relatively low). In this embodiment, a bonus event includes the insertion of a Wild symbol in a play of the primary game of one or more of the gaming devices. It should be appreciated that the bonus event thus enables the use of a Wild symbol to determine a bonus award wherein the Wild symbol is otherwise unavailable (or is relatively rarely available) for a play of the primary game.

It should be appreciated that the disclosed gaming system provides a communal game configured to repeatedly generate potential triggering events. The generated events occasionally trigger a bonus event for each of a plurality of eligible gaming devices. This eligibility may be determined by events occurring at the gaming device such as wagers made on plays of a primary game or an outcome of a primary game.

Accordingly, it is an advantage of the gaming system disclosed herein to provide a repeating communal game configured to trigger a bonus event for any eligible gaming device.

It is a further advantage of the disclosed gaming system to provide a plurality of gaming devices configured to enable players to wager on plays of a primary and a gaming system configured to display a communal game wherein at least one symbol is repeatedly generated and displayed regardless of whether a player is making wagers on plays of a primary game.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
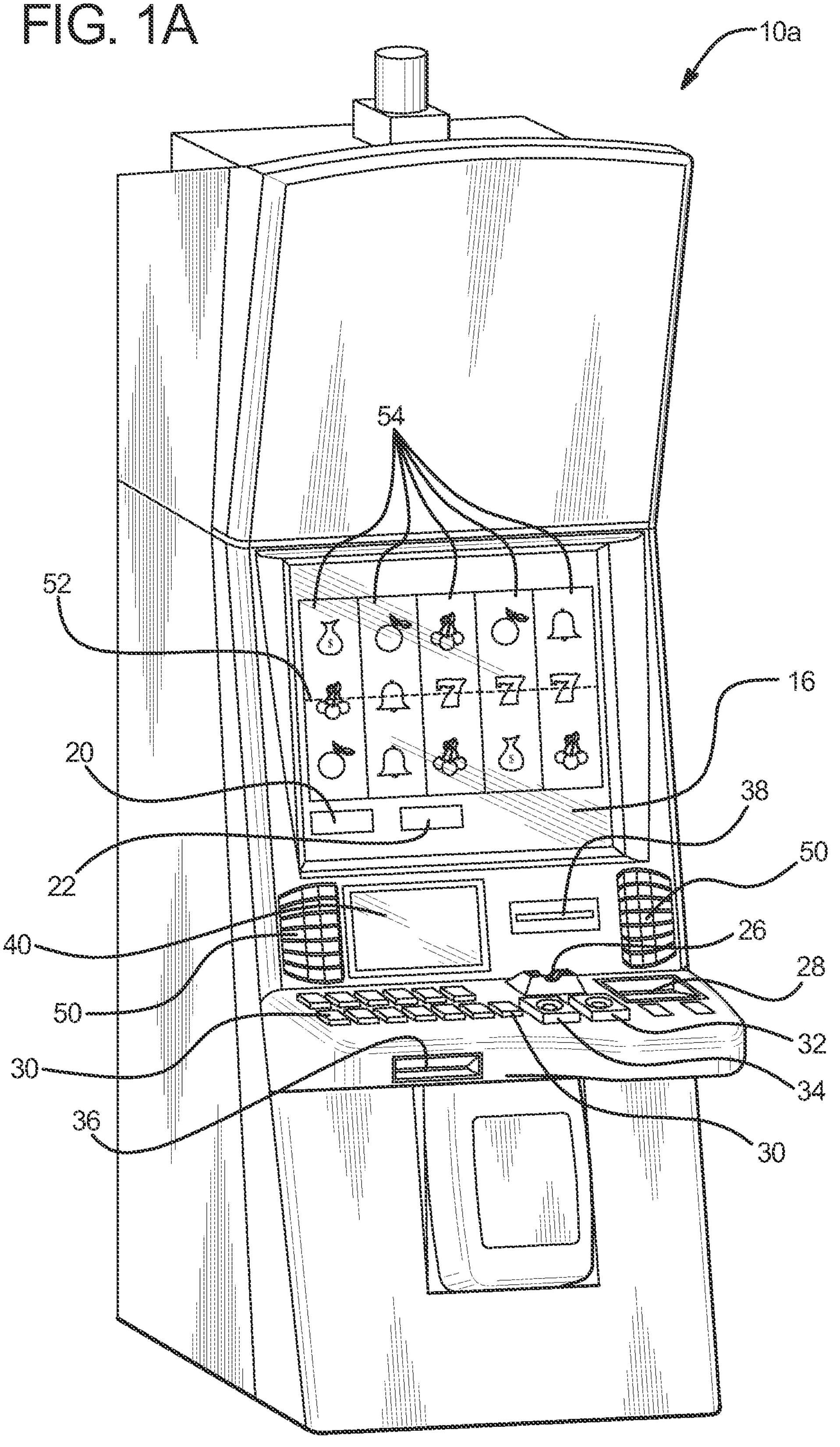
FIGS. 1A and 1B are perspective views of example alternative embodiments of the gaming device of the present disclosure.
Figure 1B:
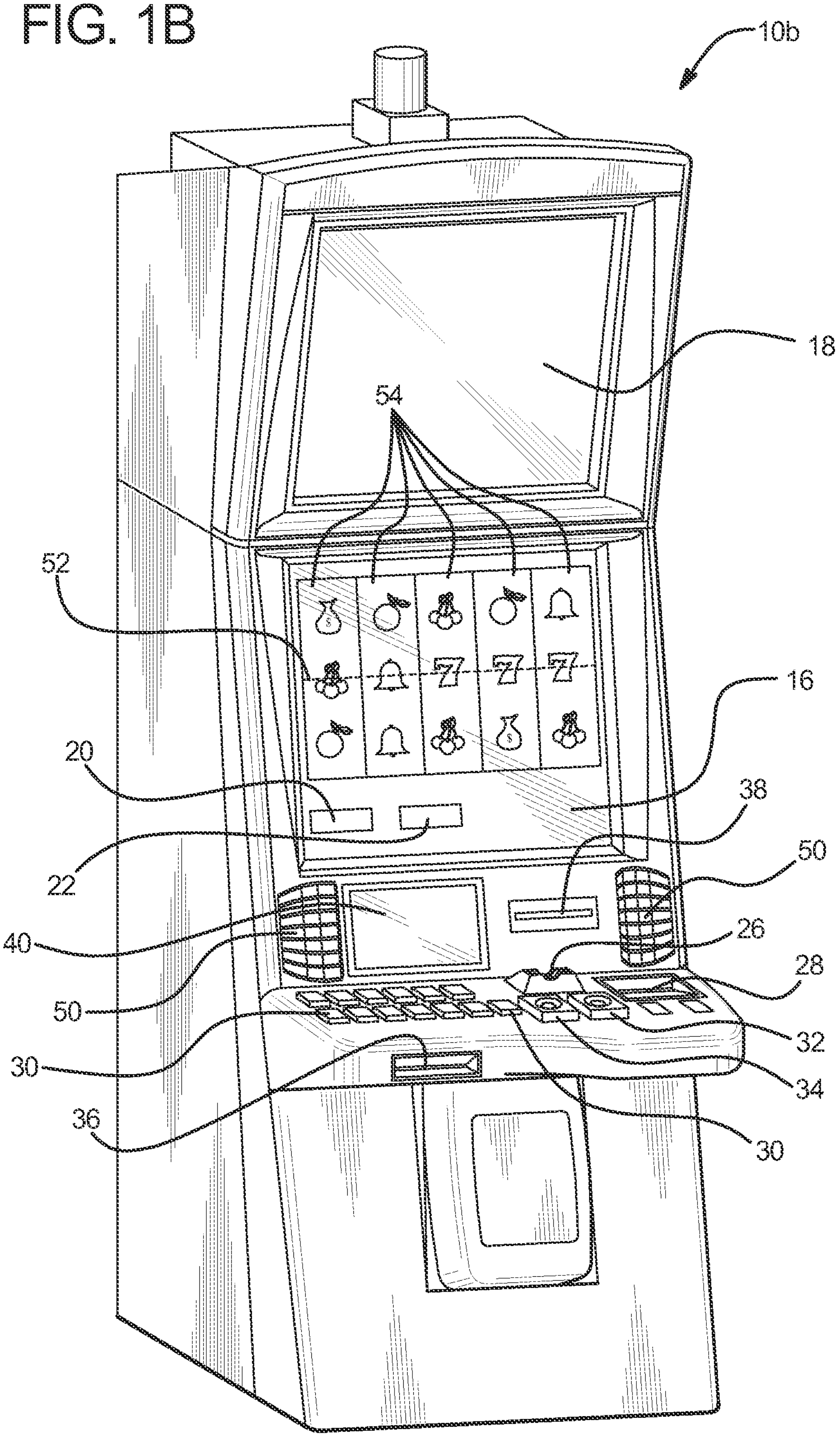

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
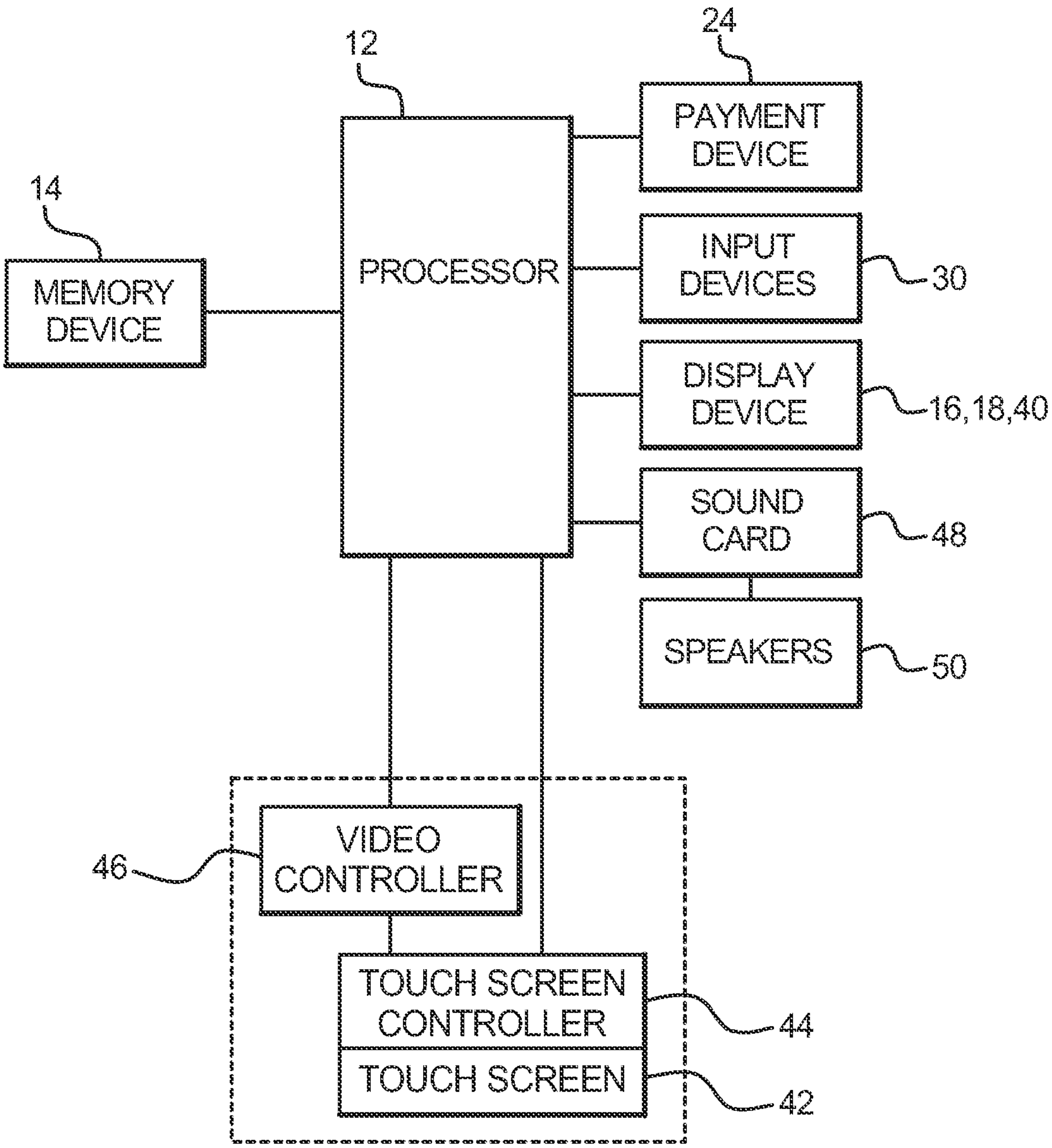
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. A gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the players wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

Figure 2B:
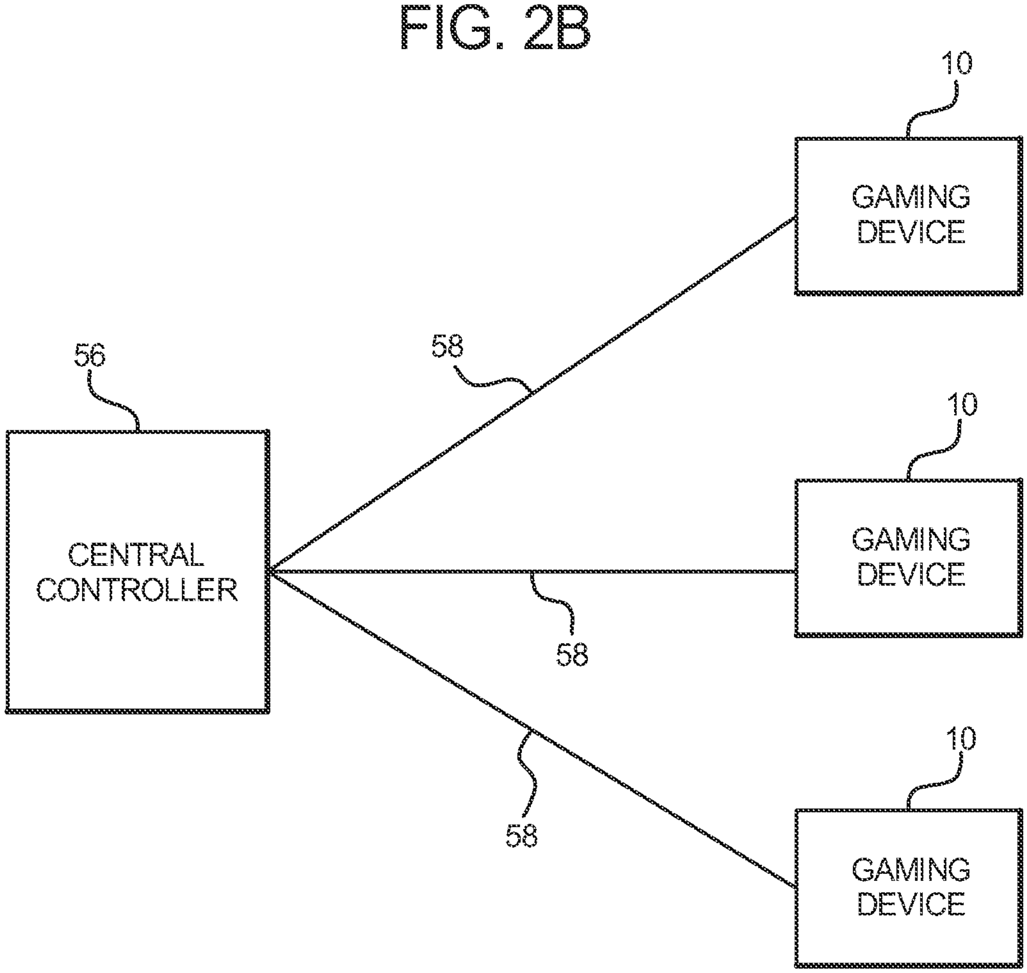
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data, in another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

Communal Game Triggers Bonus Event

In one embodiment, the gaming system disclosed herein is configured to repeatedly play a communal game, such as by generating at least one communal game symbol from a plurality of different communal game symbols. In one embodiment, the plurality of communal game symbols includes at least one designated symbol such that if the gaming system generates a designated symbol in the communal game, a bonus event is triggered for all eligible gaming devices. In another embodiment, a bonus event is triggered when the gaming system generates a designated symbol combination in the communal game. In one embodiment, the gaming system repeatedly generates and displays at least one communal game symbol regardless of whether any player is playing the primary game of any of the plurality of gaming devices of the gaming system. In various embodiments, the gaming system and/or each gaming device is configured to determine a bonus event eligibility. In various embodiments, each play of the communal game represents an opportunity for a player at an eligible gaming device to participate in a bonus event triggered by the communal game.

In one embodiment, the gaming system disclosed herein includes a central processor, at least one display device, and a plurality of gaming devices. In this embodiment, the central processor is configured to co-act with the display device to display a plurality of symbols for a communal game. Moreover, each of the gaming devices is configured to enable a player to play a primary game. In various embodiments, the central processor is further configured to co-act with each of the gaming devices to at least determine a gaming device eligibility, to indicate at least one symbol or gaming element to be integrated in the primary game of any gaming device, or to indicate an award from a bonus event.

Figure 3:
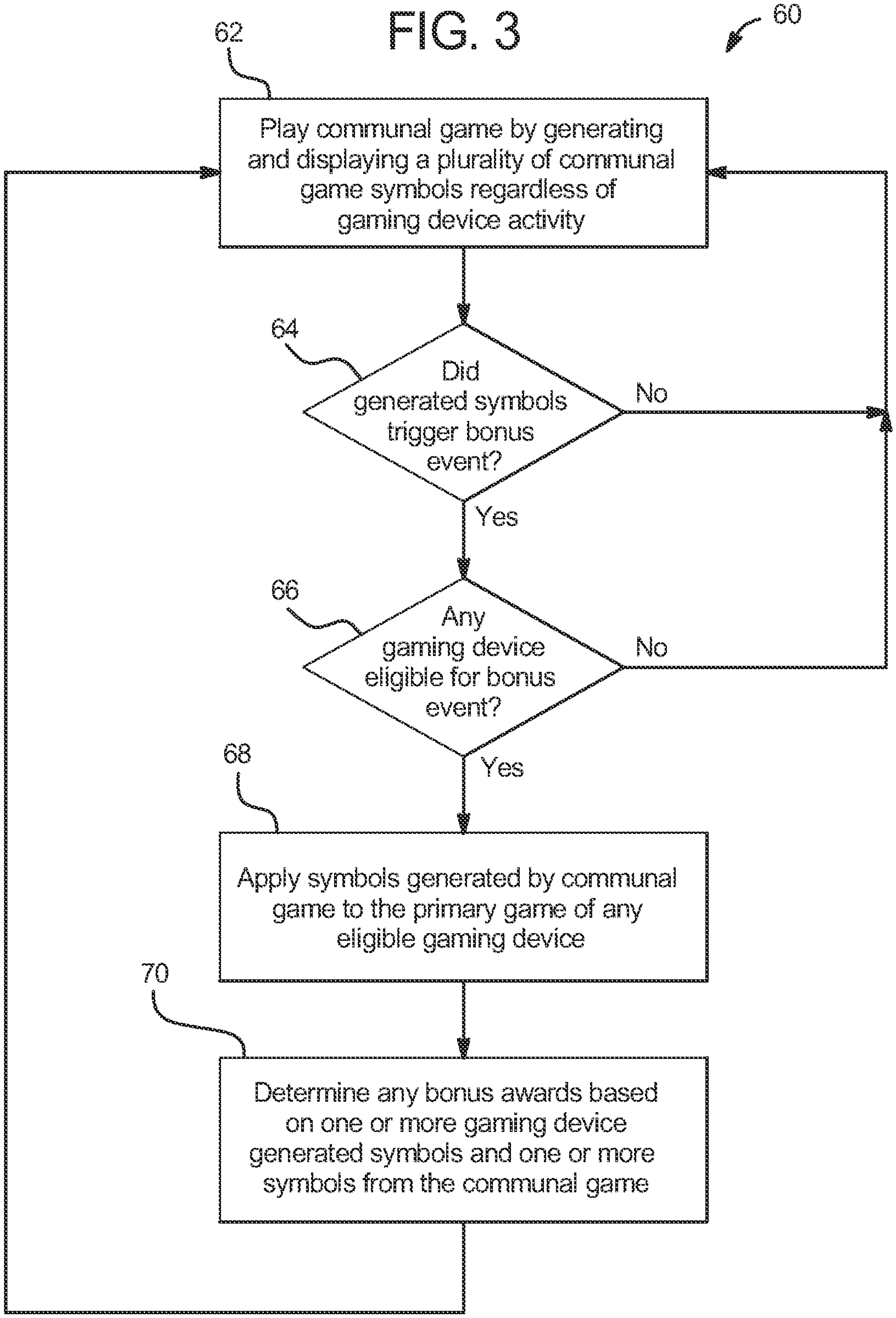
FIG. 3 is a flow chart of an example process for triggering a bonus event and providing an award in the bonus event, wherein a communal game repeatedly generates symbols until a triggering event occurs.

Referring now to the figures, FIG. 3 illustrates a flow chart of an example process 60 including a plurality of plays of a communal game and a play of a bonus event triggered by the communal game. Although the example process 60 is described with reference to the flow chart illustrated in FIG. 3, it should be appreciated that the gaming system disclosed herein is configured to enable other processes for playing the communal game and the bonus event. For example, the order of certain of the blocks may be changed, and certain of the blocks described are optional. The process 60 of FIG. 3 is illustrated from the perspective of the central processor of the disclosed gaming system. It should be appreciated that in various embodiments, various of the determinations made in process 60 of FIG. 3 are made by the central processor, a processor of one or more of the gaming devices, or a combination thereof.

In the illustrated embodiment, the process 60 forms a loop, as will be discussed below. For convenience of description, the process 60 begins when the gaming system disclosed herein plays a communal game by generating and displaying a plurality of communal game symbols, as indicated by block 62. The gaming system is configured to generate and display the plurality of communal game symbols regardless of player activity at any of the plurality of gaming devices of the gaming system, as also indicated by block 62. In various embodiments, the plurality of communal game symbols includes symbols more likely to generate winning symbol combinations (or symbols associated with higher values) than the symbols generated for plays of the primary game of one or more of the gaming devices.

For each generation and display of a plurality of communal game symbols, the gaming system determines whether the generated symbols triggers a bonus event, as indicated by block 64. In an embodiment where the communal game is a reel game or other matrix-based symbol-generating game, the appearance of a designated symbol results in the immediate commencement of a bonus event. In one such embodiment, a bonus game is triggered based on generation of a designated symbol, such as a Cherry symbol.

In one embodiment, if a play of the communal game does not trigger a bonus event, as illustrated by block 64, the gaming system plays the communal game again by generating and displaying one or more of the plurality of communal game symbols, as indicated by block 62. If, as indicated by block 64, the gaming system determines that a play of the communal game triggers a bonus event, the gaming system and/or one of the gaming devices determines whether any of the gaming devices of the gaming system are eligible for the bonus event, as indicated by block 66.

In one embodiment, a gaming device bonus event eligibility is determined for each gaming device based on one or more symbols generated for a play of the primary game. In another embodiment, a gaming device becomes eligible for a bonus event based on a wager made on a play of the primary game. In one embodiment, a gaming device becomes eligible for participation in a bonus event if one or more designated symbols or designated symbol combinations are generated and displayed for the play of the primary game. In another embodiment, a gaming device becomes eligible for a bonus event if the player at the gaming device places an adequate side wager on the play of the communal game. In one embodiment, the gaming device bonus event eligibility for each of the plurality of gaming devices is based on one or more events not displayed by the gaming device. In various embodiments, the gaming device bonus game eligibility is predetermined, randomly determined, determined based on the player's status (such as determined through a player tracking system), determined based on a random determination by the central controller, determined based on a random determination at the gaming machine, determined based on time (such as the time of day), determined based on an amount of coin-in accumulated in one or more pools or determined based on any other suitable method or criteria.

If the gaming system determines that none of the plurality of gaming devices are eligible, the gaming system is configured to initiate another play of the communal game by generating and displaying one or more symbols from the plurality of communal game symbols, as indicated by block 62. If the gaming system determines that at least one gaming device is eligible for participation in the bonus event, as indicated by block 66, the gaming system is configured to provide a bonus event for the eligible gaming device(s). In one embodiment, each eligible gaming device participates in the bonus event, such that a player at an eligible gaming device potentially receives a bonus award based on the outcome of the bonus event.

In one embodiment, the gaming system conducts the bonus event by applying one or more symbols or gaming elements generated for the communal game to the primary game of any eligible gaming device, as indicated by block 68. The gaming system determines any bonus awards resulting from the bonus event for each eligible gaming device based on the symbols generated for the primary game of that gaming device and any applied communal game symbol(s) or gaming element(s), as indicated by block 70.

In one embodiment, the gaming system disclosed herein is configured to apply one or more gaming elements to the primary game of any eligible gaming device. In various embodiments, a gaming element includes a gaming symbol, but also includes other characteristics of a plurality of generated symbols. In one embodiment, gaming elements include reels having a plurality of symbols, rows of symbols from a matrix of symbols, columns of symbols from a matrix of symbols, patterns of symbols from a matrix of symbols, hands of card games such as poker hands or blackjack hands including a plurality of cards for a communal game, sequences of symbols of a plurality of communal game symbols, relative values of symbols of a plurality of communal game symbols, or other suitable characteristics of one or more communal game symbols applicable to a plurality of symbols generated for a play of a primary game.

In one embodiment, for each eligible gaming device, one or more communal game symbols or gaming elements generated and displayed for a play of the communal game are inserted, applied, integrated, incorporated, or otherwise utilized in conjunction with the symbols generated for a play of the primary game prior to the bonus event. In one embodiment, for each gaming device, one or more symbols from the communal game are combined with the plurality of symbols generated for a play of the primary game of a gaming device to determine any awards. In one embodiment, one or more reels of a primary reel game are replaced with a plurality of communal game symbols. In these embodiments, upon insertion of the one or more communal game symbols in the primary game, the gaming system determines whether any winning symbol combinations are displayed and provides an appropriate award for any such winning combinations. In another embodiment, the gaming system enables one or more symbols for a primary game to be replaced, one symbol at a time, with symbols from the communal game.

Referring again to FIG. 3, after determining any bonus award for any eligible gaming devices, the gaming system is configured to initiate a new generation and display of at least one communal game symbol from the plurality of communal game symbols, as indicated by block 62. The process 60 results in a continuous loop wherein the gaming system generates and displays a plurality of communal symbols for a plurality of plays of a communal game. Although the process 60 of repeatedly generating and displaying communal game symbols is occasionally slowed due to a play of a bonus event, the process 60 is a loop which continuously repeats regardless of any activity by a player at a gaming device of the gaming system. It should be further appreciated that continuously and repeatedly generating and displaying a plurality of communal game symbols for a communal game increases player excitement and enjoyment for players of the gaming devices and for individuals in the gaming area or casino not playing a primary game.

The flow chart illustrated in FIG. 3 illustrates a process 60 including a plurality of plays of a communal game and a bonus event. It should be appreciated that the process 60 is generally implemented by a gaming system such that the gaming system provides a bonus event triggered by one or more repeated, independent plays of the communal game. When a bonus event is triggered, in one embodiment, the gaming system enables any eligible gaming device(s) to participate in the bonus event. During the bonus event of one embodiment, disclosed herein, the gaming system incorporates one or more gaming elements or symbols from the communal game into the primary game(s) of one or more eligible gaming devices. It should be appreciated that the gaming systems illustrated in FIGS. 4A to 4C, 5, 6A, 6B, 7A, and 7B are example embodiments of gaming systems for implementing the process 60 illustrated in FIG. 3.

Figure 4A:
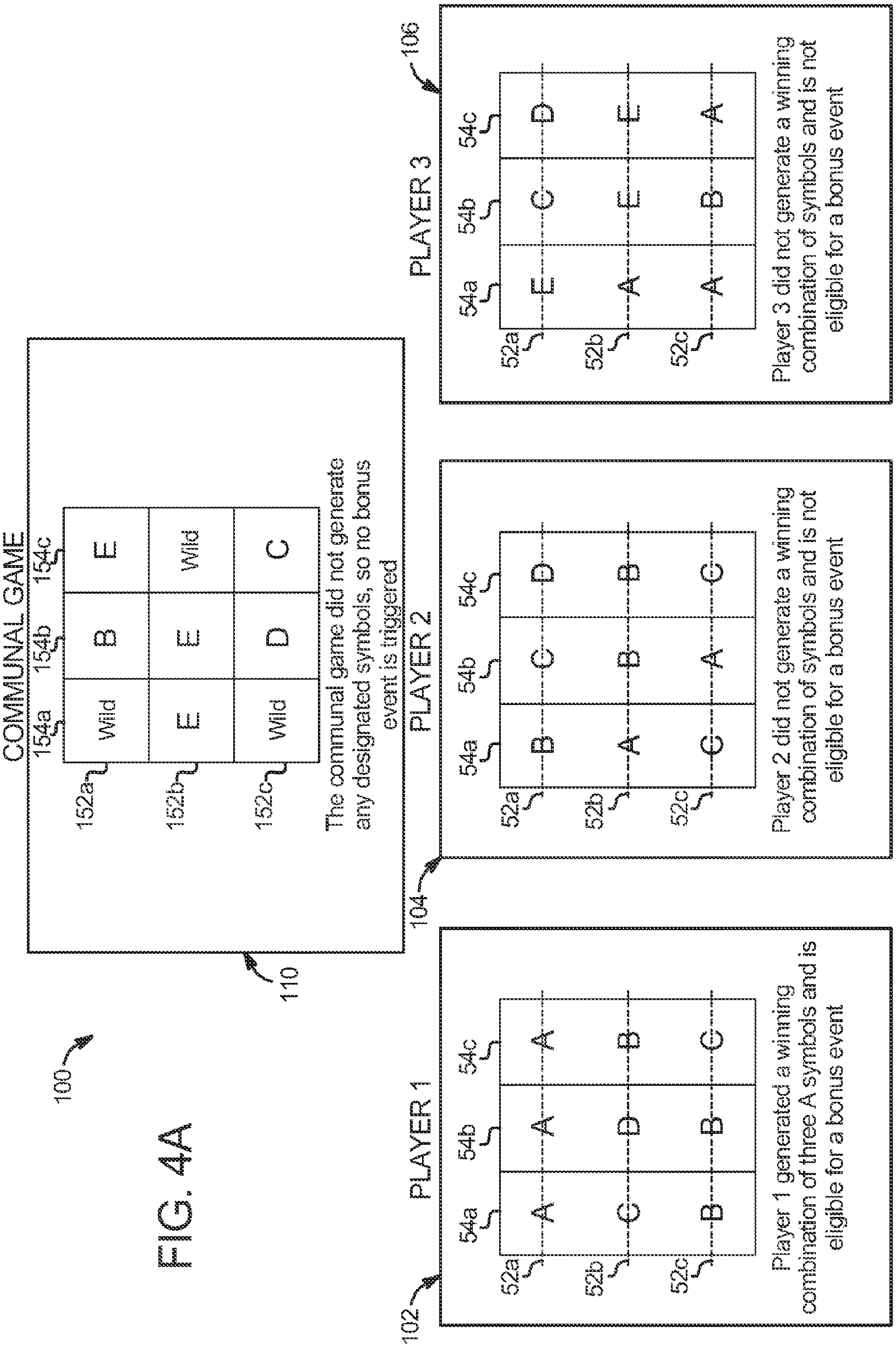
FIGS. 4A, 4B, and 4C are schematic diagrams of a plurality of reel games including a communal reel game and a plurality of primary reel games, wherein the communal reel game triggers a bonus event for any eligible primary reel game.

FIG. 4A illustrates a schematic diagram of one embodiment of the gaming system 100 disclosed herein. The gaming system 100 of the illustrated embodiment includes three gaming devices 102, 104, and 106, and a communal game 110. In various embodiments, each of the gaming devices 102, 104, and 106 of the disclosed gaming system 100 is configured to generate and display a plurality of symbols and determine a gaming device bonus event eligibility. Further, the communal game 110 is configured to repeatedly and continuously generate and display at least one communal game symbol from a plurality of communal game symbols including at least one designated symbol. Based on the generated symbols, the communal game 110 is configured to trigger a bonus event for any eligible gaming device.

In the illustrated embodiment, each of the primary games 102, 104, and 106 includes a set of reels 54*a*, 54*b*, and 54*c*, each reel including three symbol positions. Each of the primary games includes three paylines 52*a*, 52*b*, and 52*c*. In this embodiment, the primary game of each gaming device 102, 104, and 106 is configured to provide an award for a winning symbol combination including three of the same symbol on one of the paylines 52*a*, 52*b*, or 52*c*. Each gaming device in the illustrated embodiment is configured to become eligible for a bonus event upon the generation and display of a winning symbol combination (i.e., three of the same symbol on one of the paylines 52*a*, 52*b*, or 52*c*). In the illustrated embodiment, a gaming device bonus event eligibility obtained for a play of the primary game of any of the gaming devices 102, 104, or 106 applies until the next play of a primary game for that gaming device.

The communal game 110 includes a matrix of symbol positions including a plurality of rows 152*a*, 152*b*, and 152*c*, and a plurality of columns 154*a*, 154*b*, and 154*c*. The gaming system is configured to generate and display a communal symbol in each of the symbol positions of the matrix, the communal symbol selected from a plurality of communal symbols including at least one designated symbol. In the illustrated embodiment, the designated symbol is a Cherry symbol. In one embodiment, the plurality of communal symbols further includes one or more advantageous symbols not available for a play of a primary game, such as a Wild symbol. If the communal game 110 generates and displays a designated symbol (i.e., a Cherry symbol) in any position of the matrix of symbol positions, the gaming system triggers a bonus event for any then-eligible gaming devices 102, 104, or 106.

Referring to FIG. 4A, for the first play of each of the primary games of the gaming devices 102, 104, and 106 illustrated, gaming device 102 generates a winning symbol combination. Specifically, gaming device 102 generates three As on payline 52*a*. This winning symbol combination results in an award to Player 1 as well as a bonus event eligibility. Neither Player 2 nor Player 3 are eligible for a bonus game. It should be further appreciated that since the illustrated play of the communal game 110 did not generate a designated symbol (i.e., a Cherry symbol), the gaming system 100 does not trigger a bonus event. Because in the illustrated embodiment the gaming device bonus event eligibility exists for a single play of the primary game, the eligibility obtained by Player 1 is not applicable to future triggered bonus events.

Figure 4B:
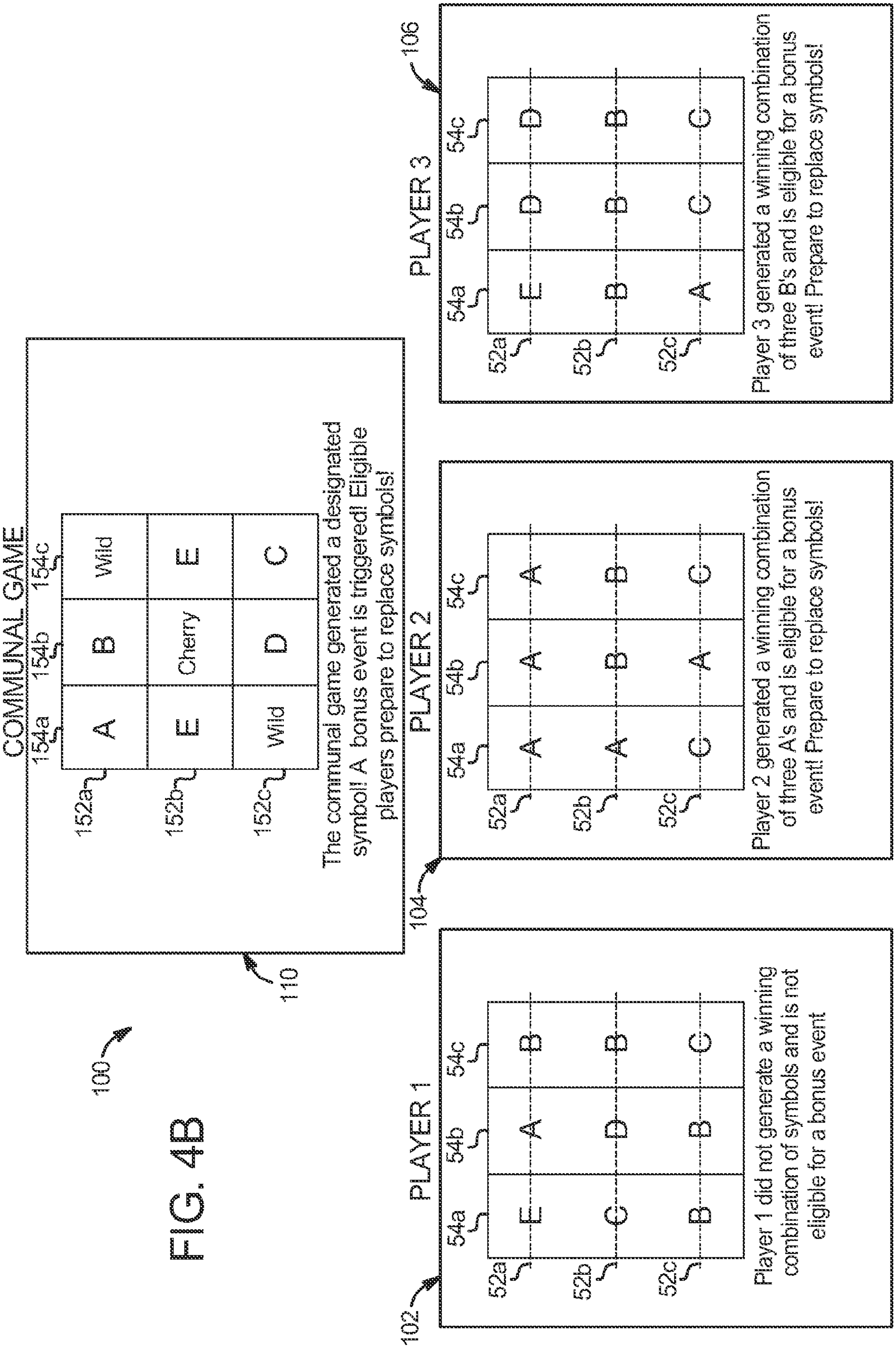

FIG. 4B illustrates a second play of the primary game of each of the gaming devices 102, 104, 106 of the gaming system 100 and a second play of the communal game 110 of the gaming system 100. In the illustrated embodiment, each of gaming devices 104 and 106 generate a winning combination of three A symbols and three B symbols on paylines 52*a* and 52*b*, respectively. As indicated above, gaming devices 104 and 106 each provide a primary game award to Player 2 and Player 3, respectively, for the winning symbol combinations for the illustrated play of the primary game. Moreover, gaming devices 104 and 106 are eligible for participation in a bonus event by virtue of generating a winning symbol combination for the illustrated play of the primary game.

The gaming system 100 also generates and displays a plurality of symbols in the matrix of symbol positions for a second play of the communal game 110. In the illustrated embodiment, the communal game 110 displays two Wild symbols and one Cherry symbol. Since the Cherry symbol is a designated symbol, eligible gaming devices 104 and 106 participate in a bonus event.

Figure 4C:
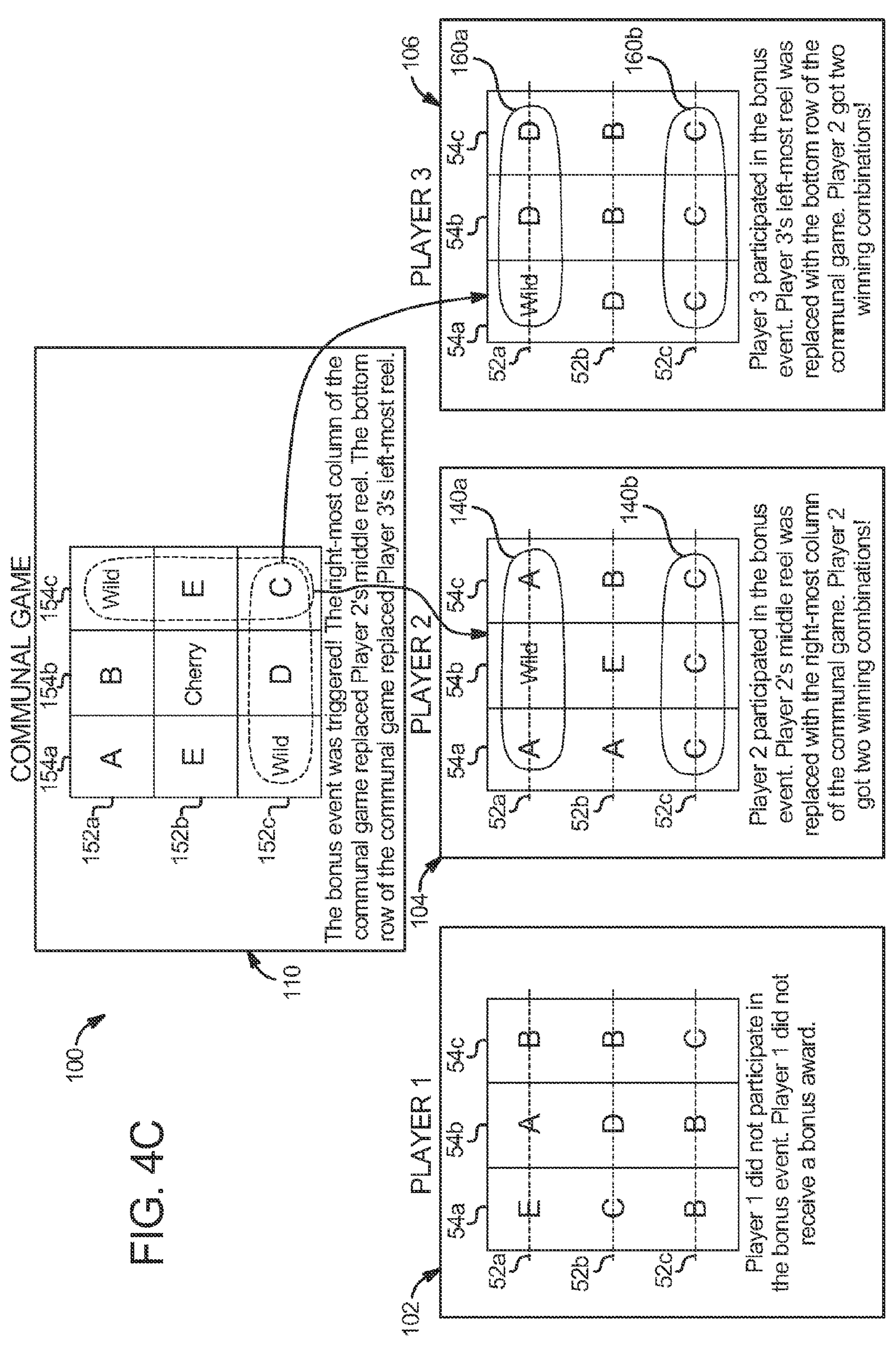

FIG. 4C illustrates one embodiment of gaming devices 102, 104, and 106 and the communal game 110 after a play of the bonus event as disclosed herein. Since the communal game 110 generates a Cherry symbol (i.e., a designated symbol) for the illustrated play of the communal game, eligible gaming devices 104 and 106 participate in the bonus event. For the illustrated play of the bonus event, the disclosed gaming system replaces one of the reels of the primary game of gaming device 104 with column 154*c* of the communal game. Similarly, the gaming system replaces one of the reels of gaming device 106 with row 152*c* of the communal game 110.

More specifically, the gaming system replaces the middle reel of the primary game of gaming device 104 with column 154*c* of the communal game, as illustrated. In one embodiment, the gaming system determines which reel of the primary game to replace based on the reel from which replacement results in the largest bonus award. As illustrated, after replacing the middle reel of gaming device 104 with column 154*c* of the communal game 110, the gaming system determines whether any winning symbol combinations are displayed for gaming device 104. In the illustrated embodiment, two winning symbol combinations 140*a* and 140*b* are displayed on paylines 52*a* and 52*c*, respectively. The gaming system thus provides a bonus award to Player 2 for generating two winning symbol combinations for the illustrated bonus event. It should be appreciated that winning symbol combinations 140*a* and 140*b* each include at least one symbol generated for the illustrated play of the primary game and at least one gaming element (i.e., a symbol of one column of the communal game) generated for the illustrated play of the communal game.

As further illustrated by FIG. 40, in one embodiment the gaming system also replaces the left-most reel of gaming device 106 with row 152*c* of the communal game 110. In the illustrated embodiment, the relative position of the symbols of row 152*c* of the communal game from left to right is maintained upon replacement from top to bottom. In various embodiments (not shown), the order of any replaced symbols are changed. In these embodiments, any of the symbols of the communal game may replace any of the symbols displayed for a play of the game of the gaming device.

After replacing the symbols of the left-most column of gaming device 106, the gaming system determines that two winning symbol combinations 160*a* and 160*b* are generated. The gaming system accordingly provides Player 3 with a bonus award based on winning symbol combinations 160*a* and 160*b*. It should be appreciated that winning symbol combinations 160*a* and 160*b* each include at least one symbol generated for the illustrated play of the primary game and at least one gaming element (i.e., a symbol of one row of the communal game) generated for the illustrated play of the communal game.

It should be appreciated that, as illustrated in FIGS. 4A to 4C, each of Player 1, Player 2, and Player 3 wagers on plays of the primary game substantially simultaneously. It should appreciated that in various embodiments (not shown), one or more of the players wagering on plays of the primary game wager on the plays at different rates. Moreover, as illustrated in FIGS. 4A to 4C, the gaming system plays the communal game at substantially the same rate as the primary games of gaming devices 102, 104, and 106. In various embodiments, the gaming system plays the communal game 110 repeatedly and continuously based on a predefined communal game repeat interval. In one embodiment, the communal game repeat interval is substantially constant for a given gaming system. In alternative embodiments, the communal game repeat interval is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

Figure 5:
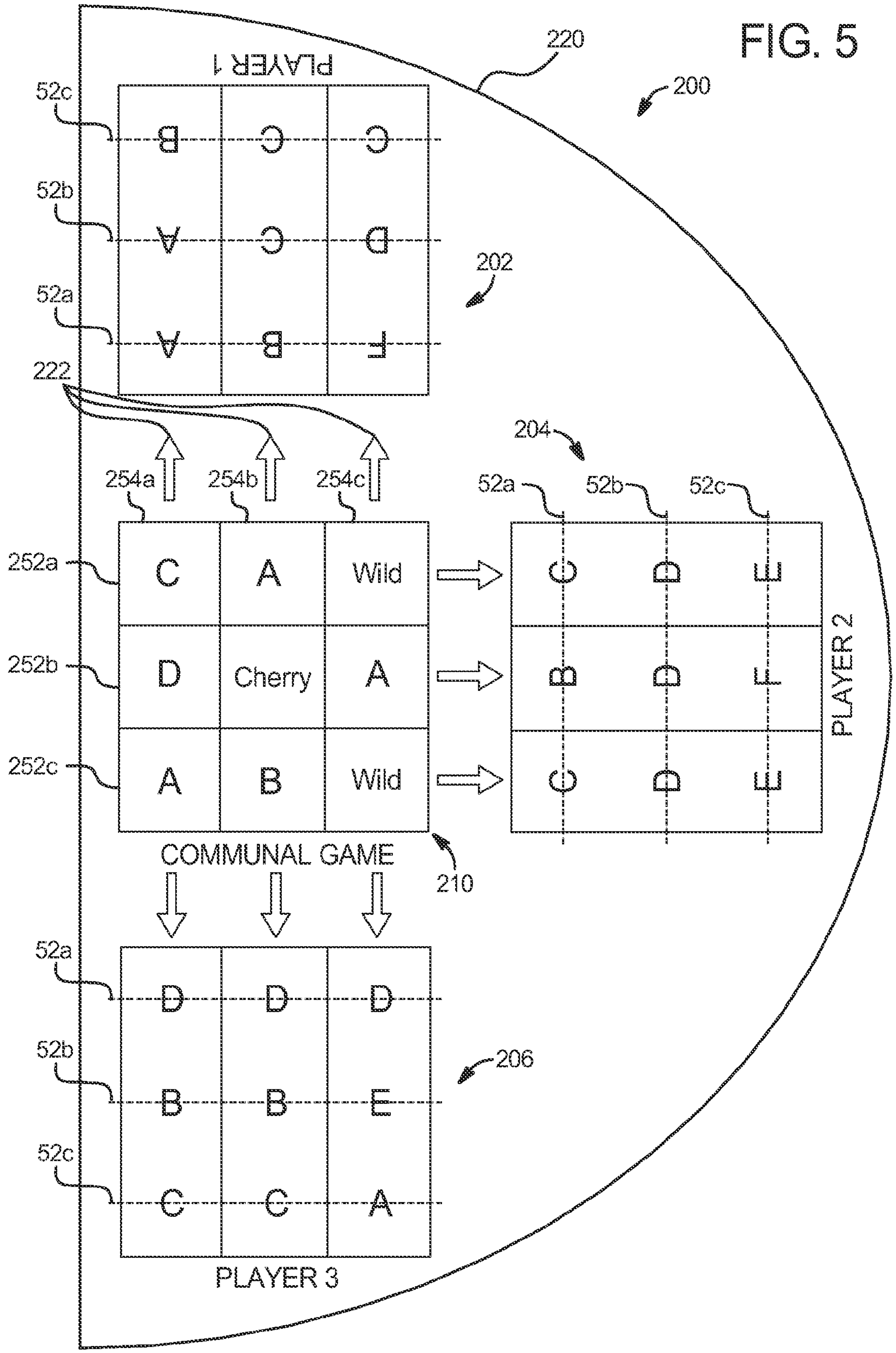
FIG. 5 is a top elevation view of a communal reel game and a plurality of primary reel games illustrated to indicate the relative physical position of each of the games at a multi-player gaming station or other bank of gaming devices.

FIG. 5 illustrates a top view of a gaming system 200 including a bank of gaming devices and a single communal game. In the illustrated embodiment, each gaming device 202, 204, and 206 is mounted at a player position of a multi-player gaming station 220. The communal game 210 is similarly mounted in or on the multi-player gaming station 220, and is positioned such that a player at each of the player positions can easily see the symbols displayed for the communal game.

In the illustrated embodiment, the multi-player gaming station 220 further includes a plurality of indicators such as arrows 222 which indicate to a player at one of the gaming devices 202, 204, or 206 the direction that one or more symbols or gaming elements of the communal game will be moved for a bonus event. In a further embodiment, the arrows 220 indicate which particular symbols of the communal game 210 are applied to each eligible primary game 202, 204, and 206 for a play of a bonus event. In various embodiments, the gaming device in which communal game symbols or gaming elements will be incorporated and the particular communal game symbols to be incorporate are predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In the illustrated embodiment, arrows 222 indicate that for a bonus event, the symbols of row 252*a* are applied to the primary game of gaming device 202, the symbols of column 254*c* are applied to the primary game of gaming device 204 and the symbols of row 252*c* are applied to the primary game of gaming device 206. In one embodiment, the application of the indicated symbols 210 occurs if the gaming devices 202, 204, or 206 are eligible for the bonus event at the time the bonus event is triggered.

In a further embodiment (not shown), if two or more designated symbols are generated and displayed by the communal game, any eligible gaming devices are configured to incorporate a first set of symbols from the communal game and receive a first bonus award for the incorporation. For each additional designated symbol generated an additional set of symbols are incorporated in the play of the primary game and an additional bonus award is provided. For example, in one embodiment, each gaming device replaces two or more of the reels with one or more columns or rows of the communal game. In this embodiment, a first reel is replaced, any awards are provided, a second reel is replaced, any awards are provided, and so on.

In one embodiment, such as the embodiment described above, the gaming system is configured to determine which symbols of the primary game to replace with one or more symbols of the communal game. In another embodiment, a designated symbol occurring in the communal game enables a player to replace one or more single symbols of the primary game with one or more single symbols of the communal game. For example, a player may replace a symbol in a combination of symbols with a Wild symbol from the communal game to result in a winning symbol combination. In still other embodiments, a player replaces two or more symbols of the primary game with two or more symbols relatively more likely to result in a bonus award or more likely to result in a relatively larger bonus award (e.g., Wild symbols) from the communal game to generate new winning symbol combinations. In various embodiments, the gaming system is configured such that the communal game is more likely to generate and display Wild symbols, higher-value symbols, individual bonus-triggering symbols, multiplier symbols, or any combination thereof.

Figure 6A:
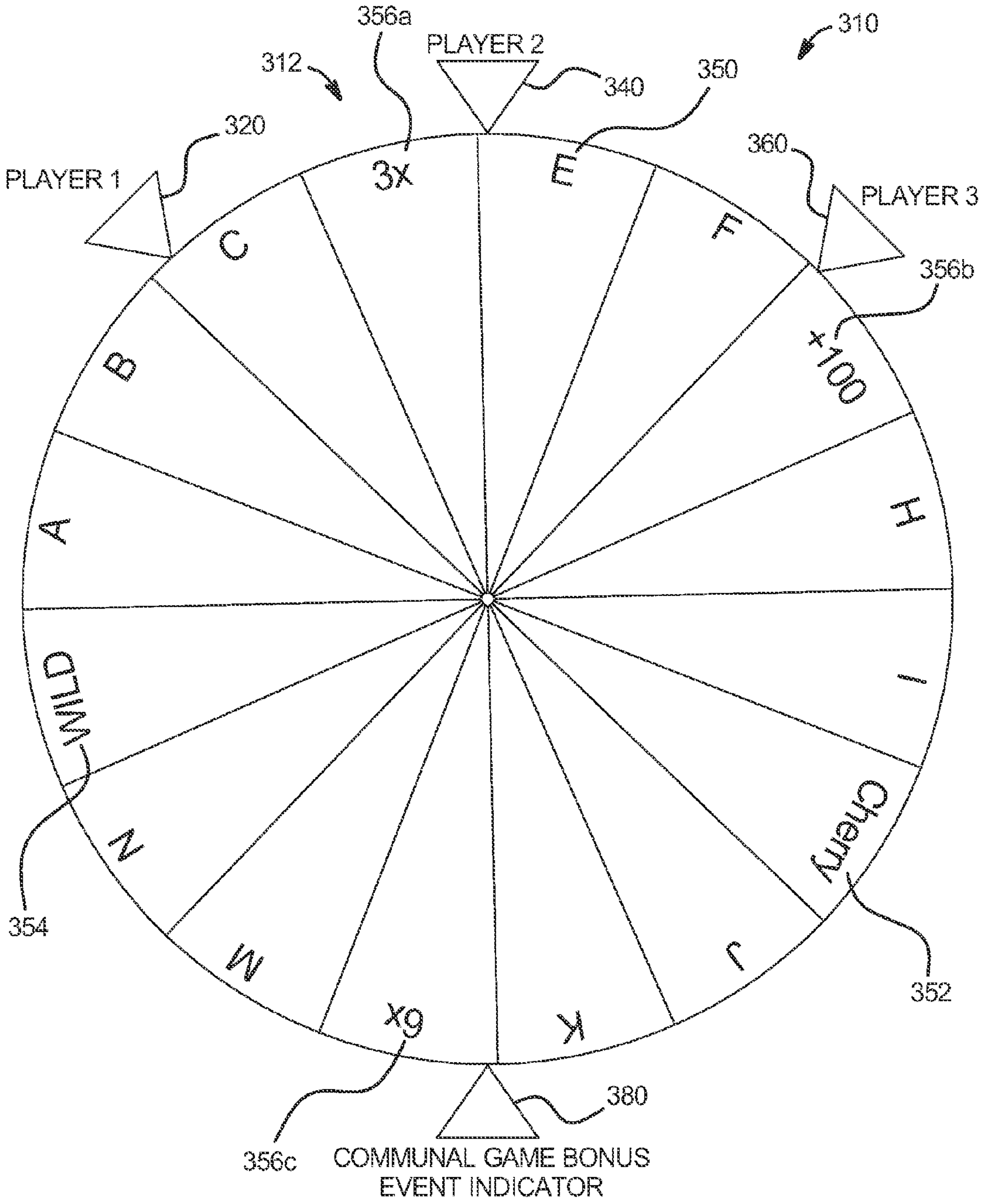
FIGS. 6A and 6B are front elevation views of the communal game of one embodiment of the gaming system disclosed herein, wherein the communal game is a wheel game.

FIG. 6A illustrates an alternative embodiment of a communal game 320 configured to generate and display one or more symbols from a plurality of communal game symbols. In various embodiments, the communal game is a wheel game including one or more wheels wherein each play of the communal game is indicated as a spin of the wheel(s). The illustrated embodiment includes a single wheel 312 having a plurality of symbol areas such as symbol area 350, wherein each symbol area is a sector of the wheel 312. In the illustrated embodiment, each symbol area is an equally sized sector. In alternative embodiments, the sectors are different sizes or the symbol areas are not sectors but rather are symbol areas of a different shape. In one such embodiment, the probability of indicating any of the sectors of the wheel is based, at least in part, on the size of each sector. In another such embodiment, the probability of indicating any of the sectors of the wheel is independent of the size of each sector.

The communal game in one embodiment displays a communal game symbol in each symbol area such as symbol area 350. Each of the plurality of communal symbols in the illustrated embodiment is simultaneously displayed in a single symbol area of the wheel 312. Although each of the plurality of communal game symbols is simultaneously displayed, the wheel 312 of the illustrated embodiment is configured to generate one or more communal game symbols from the plurality of communal game symbols by indicating such symbols using one or more wheel symbol area indicators.

In one embodiment, the wheel 312 of the communal game 310 includes a plurality of communal game symbols wherein at least one symbol is a designated symbol. In the illustrated embodiment, the designated symbol is a Cherry symbol 352. In this embodiment, if the designated symbol is indicated for a play of the communal game, the gaming system initiates a bonus event for any eligible gaming device. The illustrated communal game also includes a Wild symbol 354 configured to function as any symbol needed to create a winning symbol combination when incorporated in a plurality of primary game symbols. The illustrated communal game includes a plurality of modifier symbols 356*a*, 356*b*, and 356*c*. These symbols are configured to be incorporated in a primary game to modify an award provided for a play of the primary game.

In one embodiment, the wheel-based communal game 310 includes a plurality of symbol area indicators 320, 340, 360, and 380. In the illustrated embodiment, the communal game 310 includes a Player 1 symbol area indicator 320, a Player 2 symbol area indicator 340, a Player 3 symbol area indicator 360, and a communal game bonus event symbol area indicator 380. In one embodiment, for a play of the communal game, the gaming system disclosed herein spins the wheel 312 such that random symbols of the wheel are indicated by each of the indicators 320, 340, 360, and 380. In other embodiments, the gaming system plays the communal game by moving one or more of the symbol area indicators circumferentially around the exterior of the wheel. In one embodiment, the gaming system plays the communal game by both moving one or more symbol area indicators around the circumference of the wheel and by spinning the wheel.

In the illustrated embodiment, for a play of the communal game 310, the symbol area indicators 320, 340, 360, and 380 indicate four symbol areas. In one embodiment, the symbol in the symbol area indicated by the communal game bonus event symbol area indicator 380 is analyzed to determine whether a bonus event is triggered. In this embodiment, each of the symbol areas indicated by a player-specific symbol area indicator 320, 340, or 360 indicates a symbol to be incorporated in a primary game if the bonus event is triggered. For the play of the communal game illustrated by FIG. 6A, the communal game bonus event symbol area indicator 380 indicates the modifier symbol 6× 356*c*. In this embodiment, the modifier symbol 356*c* is not a designated symbol, so the illustrated play of the communal game does not trigger a bonus event.

Figure 6B:
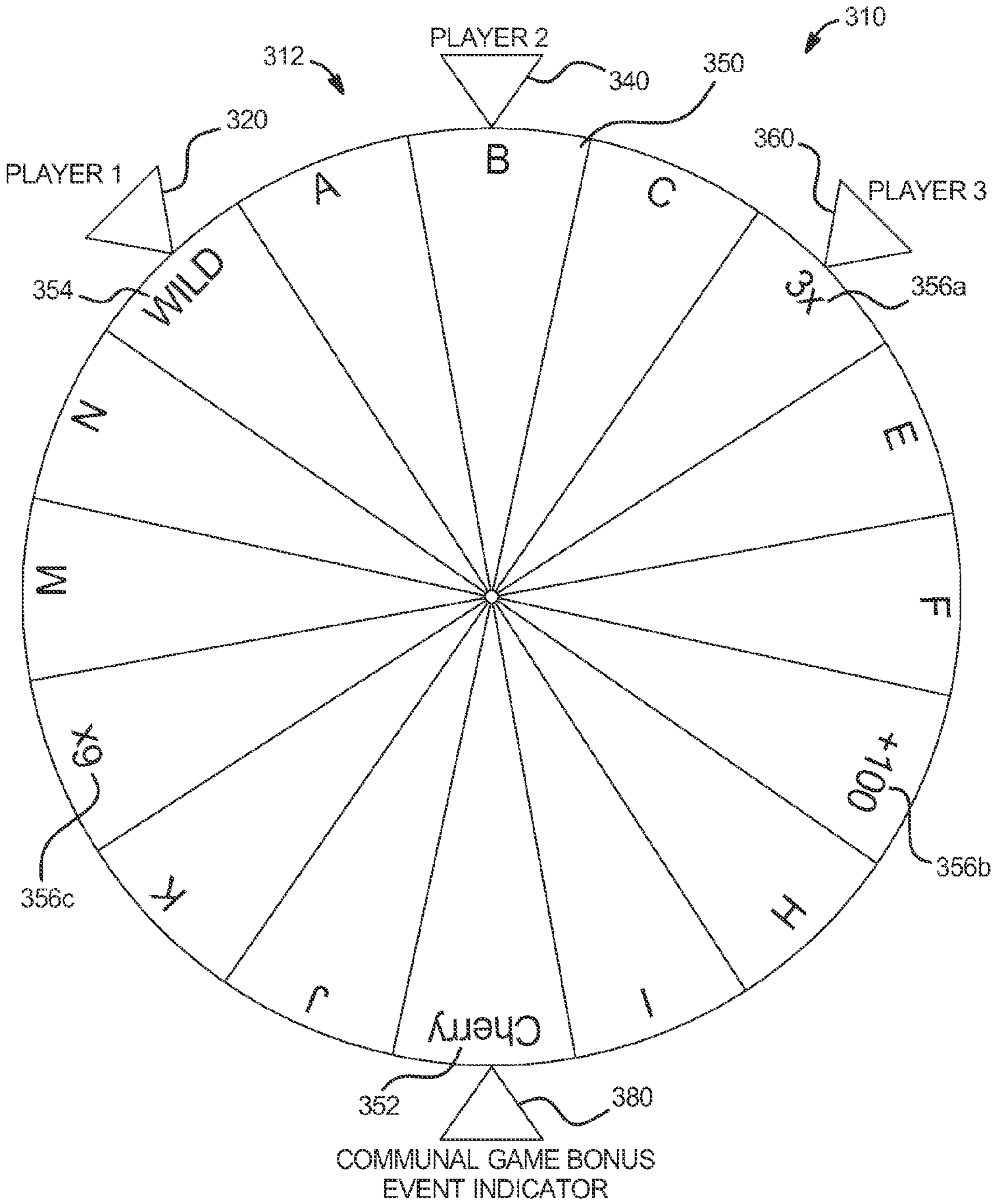

FIG. 6B illustrates the communal game 310 after a second spin of the wheel 312 for a second play of the communal game. For the spin of the wheel 312 of the illustrated embodiment, the communal game bonus event indicator 380 indicates a Cherry symbol 352. In the illustrated embodiment, the Cherry symbol 352 is a designated symbol configured to trigger a bonus event when indicated by the communal game bonus event symbol area indicator 380. Therefore, the play of the communal game 310 illustrated in FIG. 6B triggers of a bonus event for any eligible gaming devices of the gaming system. The symbol area indicators 320, 340, and 360 indicate that a Wild symbol will be applied for a play of the primary game by Player 1 if Player 1 is eligible, a B symbol will be applied for a play of the primary game by Player 2 if Player 2 is eligible, and a 3× modifier symbol will be applied for a play of the primary game by Player 3 if Player 3 is eligible.

Figure 7A:
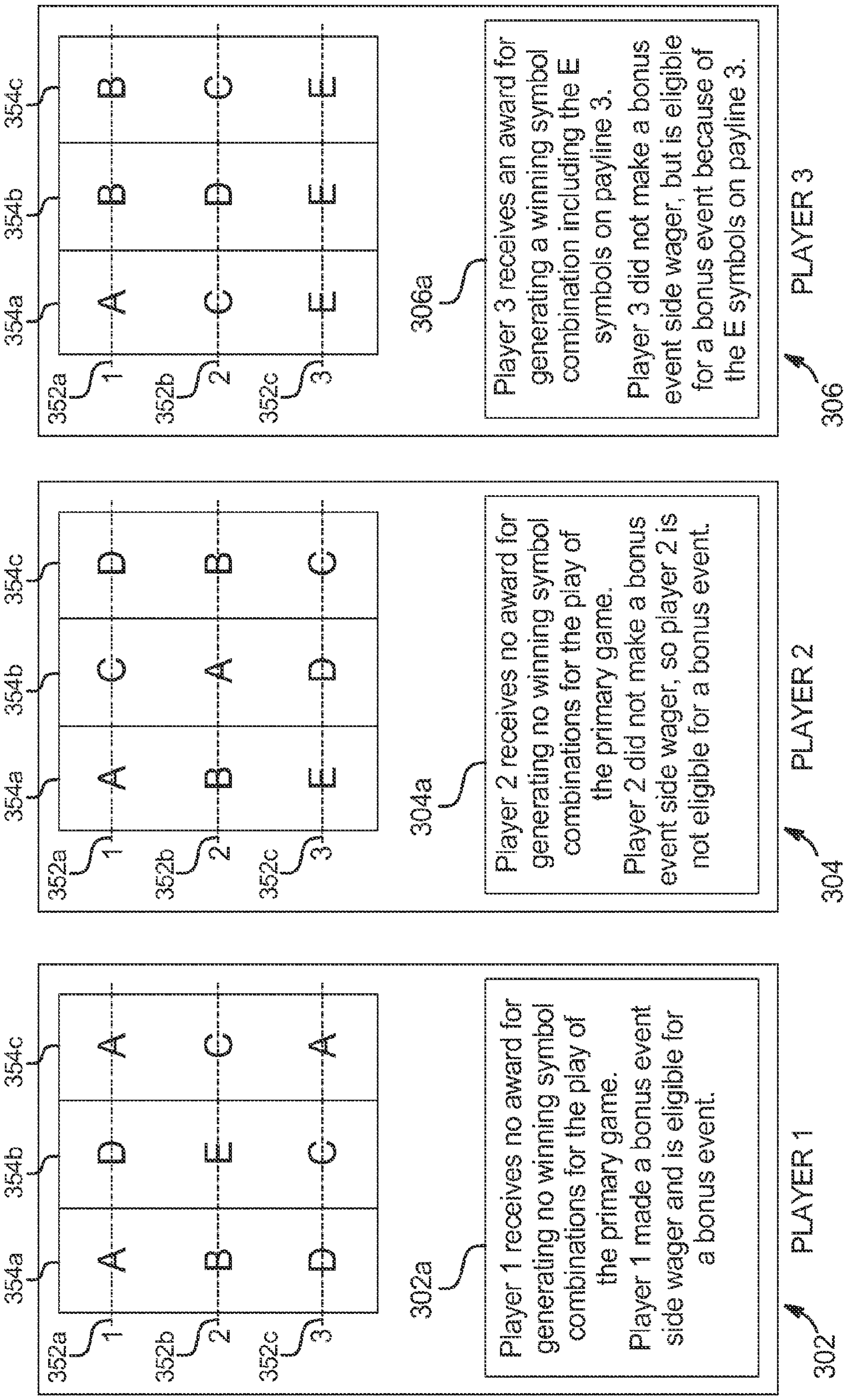
FIGS. 7A and 7B are front elevation views of a plurality of gaming devices of a gaming system including the communal game illustrated in FIGS. 6A and 6B, which illustrate the incorporation of one or more communal game symbols in the primary game of one or more eligible gaming devices.
Figure 7B:
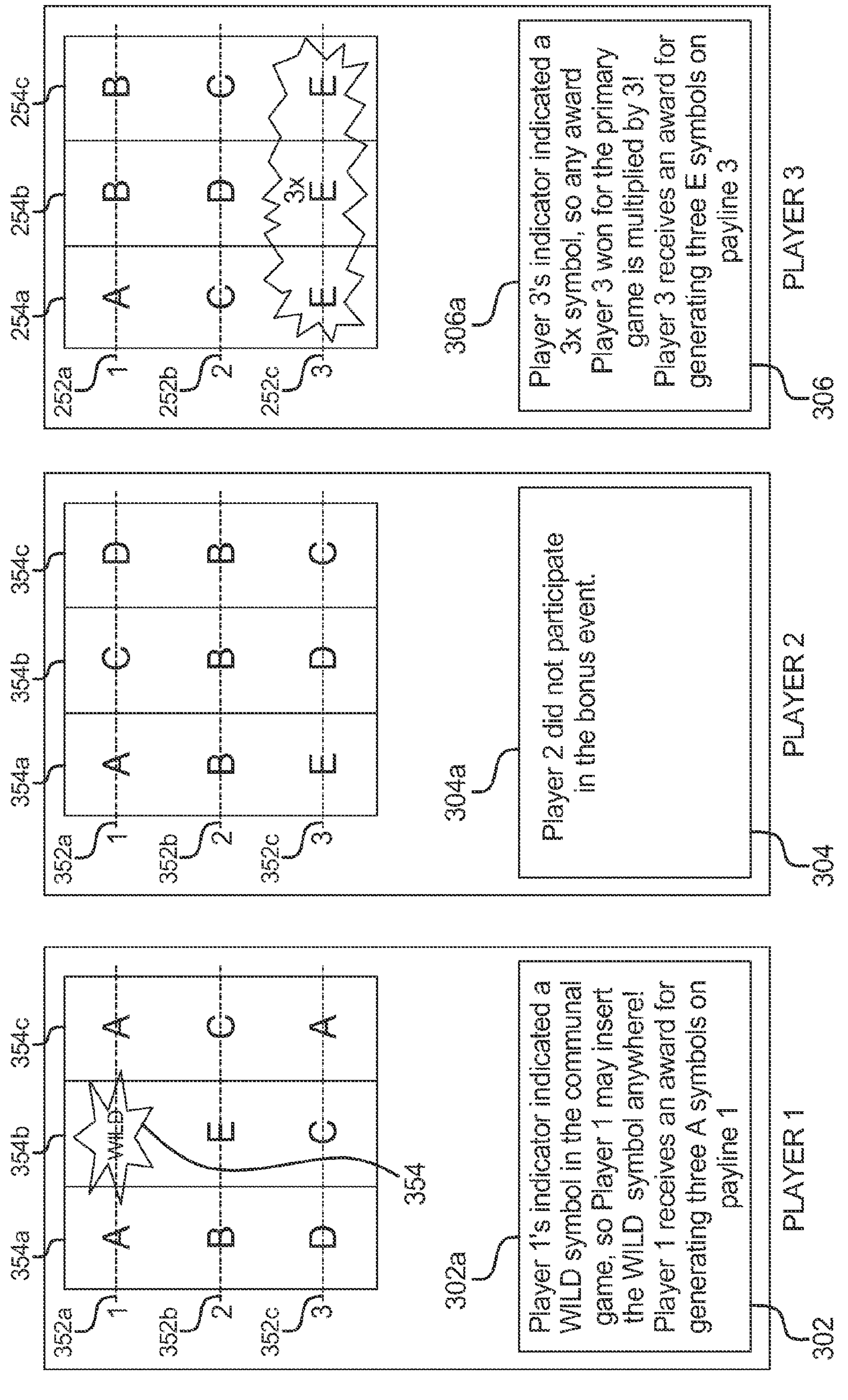

FIG. 7A illustrates a play of a primary game for each of three gaming devices 302, 304, and 306 of the gaming system disclosed herein. FIG. 7B illustrates each of the three gaming devices 302, 304, and 306 after a bonus event triggered by the communal game illustrated in FIGS. 6A and 6B. The play of the primary game indicated by FIG. 7A occurs prior to the play of the communal game indicated in FIG. 6B and the bonus event illustrated by FIG. 7B is triggered by the play of the communal game indicated by the spin of the wheel illustrated in FIG. 6B.

Referring first to FIG. 7A, a play of the primary game for each of three gaming devices 302, 304, and 306 is illustrated. Although FIG. 7A indicates that the plays of the primary game occur simultaneously, in various embodiments one or more of the players at one or more of the gaming devices 302, 304, or 306 wagers on plays of the primary game at different rates.

In the illustrated embodiment, neither Player 1 nor Player 2 receives an award for the illustrated play of the primary game. As illustrated, the primary game symbols generated for the illustrated play of the primary game of gaming devices 302 and 304 do not generate a winning combination of three of the same symbols on one of the paylines 352*a*, 352*b*, or 352*c*. Thus, as indicated by message areas 302*a* and 304*a*, Players 1 and 2 do not receive an award for the illustrated play of the primary game.

The generated primary game symbols of gaming device 306 result in a winning combination of symbols for gaming device 306. As illustrated, three E symbols are generated along payline 352*c* of gaming device 306. Thus, as indicated by message area 306*a*, the gaming device provides Player 3 with an award for the winning symbol combination on payline 352*c*.

As further illustrated by FIG. 7A, gaming devices 302 and 306 are eligible for a bonus event. In the illustrated embodiment, eligibility for a bonus event is determined by whether a player at a gaming device makes an adequate wager on the play of the communal game. Moreover, in the illustrated embodiment, if a player generates a winning symbol combination for a play of the primary game, the player is eligible for a bonus event. It should be appreciated that in various embodiments, the gaming system does not require a player to make an adequate wager and generate a winning symbol combination. In various embodiments, only one of an adequate side wager and a winning symbol combination is required to make a player eligible for participation in a bonus event. Message area 302*a* indicates that Player 1 made a bonus event side wager sufficient to be eligible for the bonus event. Message area 304*a* indicates that Player 2 not make a bonus event side wager, so Player 2 is not eligible to participate in the bonus event. Message area 306*a* indicates that Player 3 is eligible for the bonus event based on the winning combination of three Es on payline 352*c*.

In the illustrated embodiment, for a triggered bonus event, each eligible gaming device is configured to apply at least one communal game symbol (i.e., at least one symbol in a symbol area of the wheel 312) to the symbols generated for a play of the primary game. The communal game symbol to be applied is the symbol indicated by the indicator 320, 340, or 360 associated with the appropriate eligible gaming device 302, 304, or 306.

As illustrated in FIG. 6B, the play of the communal game 310 (i.e., the spin of the wheel 312) resulted in the indication by the communal game bonus event symbol area indicator 380 of the Cherry symbol. Since the Cherry symbol is the designated symbol, the spin of the wheel illustrated in FIG. 6B triggers a bonus event. As further indicated by FIG. 6B, Player 1's symbol area indicator 320 indicates a Wild symbol, Player 2's symbol area indicator 340 indicates a B symbol, and Player 3's symbol area indicator 360 indicates a 3× modifier symbol after the play of the communal game.

Referring to FIG. 7B, Player 1 made a bonus event side wager sufficient to be eligible for the bonus event. For the play of the bonus event, the gaming system enables Player 1 to insert the Wild symbol 354 indicated by the Player 1 symbol area indicator 320 anywhere in the primary game generated by gaming device 302. In an alternative embodiment (not shown), the gaming system determines where in the primary game of the gaming device 302 to insert the Wild symbol 354. In the illustrated embodiment, Player 1 inserts the Wild symbol 354 on the middle reel 354*b* on the top payline 352*a* of gaming device 302, thus forming a winning symbol combination including three A symbols on payline 352*a*. As indicated in message area 302*a* of gaming device 302, the gaming system provides Player 1 with a bonus award based on the newly-generated winning symbol combination as a bonus award. This bonus award is based in part on at least one symbol generated for the play of the primary game, and based in part on at least one symbol generated for a play of the communal game which triggered the bonus event.

FIG. 7B also illustrates the outcome of the bonus event triggered by the play of the communal game illustrated in FIG. 6B for gaming device 306. In the illustrated embodiment, Player 3 received an award for generating a winning combination of three E symbols on payline 352*c* of gaming device 306 for a play of the primary game. Moreover, as indicated in FIG. 6B, the Player 3 symbol area indicator 360 indicated a 3× modifier symbol 356*a*. The gaming system in one embodiment applies the modifier symbol to any award won for the play of the primary game. In the illustrated embodiment, the award Player 3 received for generating a winning combination of three E symbols on payline 352*c* of gaming device 306 is multiplied by three based on the 3× modifier symbol 356*a*. It should thus be appreciated that the bonus award provided to Player 3 for participating in the bonus event is based at least in part on one or more symbols generated for a play of the primary game, and at least in part on one or more symbols generated for the play of the communal game which triggered the bonus event.

In various embodiments, the communal game illustrated in FIGS. 6A and 6B does not result in the application of a symbol from the plurality of communal symbols to the primary game of each gaming device 302, 304, and 306 of the gaming system. In one embodiment, one or more of the symbol areas such as symbol area 350 of the wheel 312 are empty. In this embodiment, if a player symbol area indicator 320, 340, or 360 indicates an empty symbol area, the gaming system is configured not to provide a bonus event for the associated gaming device. In one embodiment, for a single bonus event, the gaming system spins the wheel more than one time, and each symbol indicated by any of the Player symbol area indicators is applied to a primary game of a gaming device. In one embodiment, a single Player symbol area indicator indicates a plurality of symbols serially, such that for each eligible gaming device the gaming system spins the wheel 312 and generates a single communal game symbol to be applied to that Player's gaming device.

In one embodiment, the gaming system enables at least one of the players to accumulate a plurality of symbol area indicators such as symbol area indicators 320, 340, or 360. In this embodiment, each additional symbol area indicator accumulated by a player provides the player with an additional opportunity to indicate symbols for spins of the wheel of the communal game. In various embodiments, the gaming system provides these additional symbol area indicators based on one or more of a qualifying side wager and a generation of a designated winning symbol combination for a play of the game. In different embodiments, whether the gaming system provides additional symbol area indicators to one or more of the players is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

The wheel-based communal game disclosed herein is configured be spun repeatedly and continuously, regardless of any activity for any of the gaming devices of the gaming system, and to trigger bonus event based on one or more indicated symbols. In various embodiments, one or more of the gaming devices of the gaming system participate in the bonus event if that gaming device has become eligible based on player activity at the gaming device, such as a player wagering on plays of a primary game.

In one embodiment, the communal game disclosed herein is a symbol-generating game wherein each of a plurality of symbols is randomly generated and displayed from a plurality of communal game symbols. In this embodiment, one or more symbols is replaced at a time, such that one or more symbols persist throughout more than one play of the communal game.

Similarly, any suitable method of indicating a plurality of symbols may be utilized to determine potentially winning combinations of symbols. For example, if the communal game is a card game such as a poker game, one or more winning combinations of symbols may be defined based on the strength of a standard poker hand. In one such embodiment, any hand stronger than a two-pair hand by standard poker rules triggers a bonus event. Thus, if the communal game deals a hand with a higher value according to standard poker rules than a two-pair hand, the gaming system in one embodiment triggers a bonus game for any eligible gaming device.

In another embodiment, the communal game is a card game, wherein the plurality of communal game symbols include the cards of a standard deck of cards. In one embodiment, wherein the communal game is a card game, the gaming system selects one or more cards from the deck of cards and displays them on a display device. The displayed cards are the generated symbols as understood herein. In one such embodiment, one or more of the cards is a designated card for purposes of determining whether a bonus event has been triggered.

In one embodiment, one or more designated communal game symbol combinations trigger a bonus game for any eligible gaming devices. For example, in an embodiment wherein the communal game is a reel game, a winning symbol combination on a payline of the communal game triggers a bonus game.

In various embodiments, the communal game is configured to enable a person watching the display of the communal game to anticipate which symbol or symbols are needed to trigger a bonus event. In these embodiments, for example, a person knows that a designated symbol or symbol combination will trigger the bonus event. Thus, the disclosed gaming system enhances excitement and enjoyment, since the symbol or symbols that trigger a bonus event are clearly ascertainable by people watching the communal event, including any player playing a primary game of one of the plurality of gaming devices of the gaming system.

In one embodiment, the gaming system is configured to repeatedly play the communal game regardless of any activity at one or more of the gaming devices of the gaming system. For example, the gaming system is configured to play the communal game regardless of whether a player is wagering on plays of a primary game and regardless of whether a player is playing a primary game. In this embodiment, the repeating communal game adds excitement and enjoyment for players of the gaming devices as well as observers in the gaming area by displaying symbols and triggering bonus events regardless of whether any gaming devices are eligible.

The plurality of communal game symbols may include Wild symbols not available for plays of a primary game. In one such embodiment, the triggering of a bonus event enables one or more Wild symbols to be inserted in a plurality of primary game symbols to potentially form winning symbol combinations using the Wild symbols. Since Wild symbols can be evaluated as any symbol needed to form a winning symbol combination, the insertion of a Wild symbol makes the generation of a winning symbol combination more likely. In one alternative embodiment, Wild symbols are available in the primary game but are more likely to occur for a play of the communal game. In this embodiment, the incorporation of one or more communal game symbols in a play of a primary game is more likely to result in a winning symbol combination because a Wild symbol is more likely to be generated and displayed for the communal game and incorporated into the primary game symbols.

In one embodiment, the symbols of the communal game are configured such that if they are involved in a winning symbol combination, the award provided for the winning symbol combination is relatively larger than available primary game awards. In one embodiment, the plurality of symbols of the communal game are selected from a relatively small pool of communal game symbols such that generating more than one of the same communal game symbols is more likely. The communal game symbols may include one or more symbols in addition to the Wild symbols not available in the primary game, or the more favorable symbols included available in both the communal game and the primary game may be probabilistically more likely to occur in the communal game.

In other embodiments, the plurality of communal game symbols varies based on factors such as the number and quantity of wagers being made on plays of the primary game, the ranking of players at the gaming devices of the gaming system, the time of day, the location of the gaming system in the gaming area, or other suitable factors. In one embodiment, the probability of generating and displaying one or more designated communal game symbols varies based on the number and quantity of wagers being made on plays of the primary game, the ranking of players at the gaming devices of the gaming system, the time of day, the location of the gaming system in the gaming area, or other suitable factors.

In one embodiment, a gaming device bonus event eligibility is determined for each play of a primary game. In this embodiment, a gaming device's eligibility is reset for each new play of the primary game, such that to participate in a bonus event, the communal game event must trigger a bonus event between the end of a play of a primary game wherein eligibility is obtained and before the beginning of the next play of the primary game. In one embodiment, gaming device bonus event eligibility resets after a predefined period of time or quantity of games played. In various embodiments, the amount of time or quantity of games played is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In one embodiment, the gaming system is configured to prevent a player from obtaining eligibility and not wagering on another play of the primary game until the triggering event occurs in the communal game.

In one embodiment, a gaming device becomes eligible for a bonus game if one or more designated symbols or designated symbol combinations occur for more than one consecutive play of the primary game (i.e., a player generates a winning symbol combination for two consecutive spins of a plurality of reels).

In various embodiments, bonus event eligibility is associated with a player or a gaming device. In one embodiment, an eligibility is associated with a player such that if a player obtains bonus event eligibility at a first gaming device and moves to a second gaming device, the player may participate in a bonus event at the second gaming device based on the player's bonus event eligibility. In this embodiment, eligibility may be tracked by a player status card or other suitable player tracking system. In one embodiment, eligibility is associated with a gaming device such that if a first player obtains eligibility at a gaming device and leaves the gaming device, a second player at that gaming device may still participate in a bonus event based on the gaming device's bonus event eligibility.

In various embodiments, a gaming device bonus event eligibility persists for more than one play of a primary game. In one such embodiment, if a gaming device becomes eligible for a bonus event, the gaming device remains eligible until after the end of the next bonus event. In one embodiment, the gaming device remains eligible until after the next bonus event so long as a player wagers on plays of the primary game at a predefined frequency. In one embodiment, the gaming device remains eligible for a predefined plurality of plays of a primary game. In various embodiments, any suitable method for determining when a gaming device bonus event eligibility expires may be used.

In one embodiment, a gaming device becomes eligible for a bonus event if an adequate side wager is placed and if a designated symbol or symbol combination is generated for a play of the primary game. In various embodiments, placing an adequate side wager buys a player a designated quantity of time during which the gaming device is eligible for participation in the bonus event. In different embodiments, placing an adequate side wager buys a player a designated number of spins during which the gaming device is eligible for participation in the bonus event. In these embodiments, if the communal game triggers a bonus event during the eligibility caused by the appropriate side wager, the player participates in the bonus event. In one embodiment, the gaming device bonus event eligibility is based on one or more events displayed by the gaming device.

In various embodiments, a gaming device becomes eligible for a bonus event if that gaming device is active. In such embodiments, whether a gaming device is active is based on whether that gaming device is actively being played and does not count each gaming device that is not actively being played. In one such embodiment, the central server determines if a gaming device is being actively played based on the status of such gaming device as either enrolled or inactive status or active status. In one such embodiment, the enrolled or inactive status means that the gaming device is one of the linked gaming devices in the system, but is not being actively played by a player during a group bonus event qualification period. A gaming device may be classified as enrolled status for several reasons. For example, no player may be playing the gaming device. In another example, a player could be playing the gaming device (i.e., by having credits on the gaming device), but be playing too slowly or be interrupted during play. In this case, the player could have credits on the credit meter of the gaming device, but the player has not made a wager on a primary game or otherwise qualified for a group bonus event during the group bonus event qualification period.

In one such embodiment, the active status means that the gaming device is being actively played by a player during a bonus event qualification period. In one embodiment, actively playing during a bonus event qualification period means that the player is playing the primary game of the gaming device (i.e., placing wagers on plays of the primary game) at least at a predefined minimum rate during a predefined time period. For example, the gaming device may be in active status when a player has made at least one play of the primary game in a fifteen second period prior to the communal game triggering of the bonus event. In this example, the bonus event qualification period is that fifteen second period prior to the triggering of the bonus event.

In another embodiment, the active status is alternatively or additionally based on the amount wagered on the plays of the primary game during a bonus event qualification period. In a further alternative embodiment, the determination of the active status is based on a designated minimum number of plays of the primary game or number of wagers on the primary game in a designated time period. The determination of active status may take into account other factors such as interruptions or displays in play of the primary game such as caused by the triggering of other bonuses or the operation of other secondary games of the gaming devices. In another embodiment, a gaming device can only be determined to be an active gaming device if an additional wager, such as a side-bet or side-wager, is made by a player at a gaming device of the gaming system for one player of a game, a plurality of plays of a game or all plays of a game in a designed period of time, such as a designed time period. It should be appreciated that a gaming device is classified as active based on any one or more suitable parameters or criteria as determined by the implementer or operator of the gaming system.

The gaming system disclosed herein contemplates other or additional methods for determining that a gaming device is active. For instance, the player may be enabled to make a side wager or additional wager to be active for one or more subsequent group bonus events. The side wager feature could also be time based where the additional wager causes the gaming device to be active for a subsequent time period, such as one minute. In another alternative embodiment, a minimum wager level is required for a gaming device to qualify to participate in the group bonus event. In one embodiment, this minimum wager level is the maximum wager level for the primary game in the gaming device. This requirement is in addition to the requirement that the gaming device be active to qualify to participate in the group bonus event participation gaming sequence. Another method for determining if the gaming device is active is whether or not the player has wagered a minimum level of monetary units since the communal game last triggered the bonus event. In another embodiment, each wager (or alternatively each side wager) placed by a player is utilized by the gaming system to allocate or associate an amount of time for which the players gaming device will be considered active. In this embodiment, if the gaming device has at least an amount of allocated time remaining when the communal game triggers the bonus event (i.e., the allocated amount of time has not elapsed), the gaming device is considered active. In another embodiment, each wager (or alternatively each side wager) placed by a player is utilized by the gaming system to allocate or associate a quantity of evaluations for which the player's gaming device will be considered active. In this embodiment, if the gaming device has at least one evaluation remaining when the communal game triggers the bonus event (i.e., the allocated quantity of evaluations have not all been used), the gaming device is considered active.

In another embodiment, active status is alternatively or additionally based on the total quantity of gaming devices in the gaming system which have accumulated at least a designated quantity of evaluation points. In another embodiment, active status is alternatively or additionally based on the total quantity of accumulated evaluation points for each of the gaming devices in the gaming system. In another embodiment, active status is alternatively or additionally based on the quantity of unique gaming machines that have played one or more games during a previous time period. In an alternative embodiment, active status is additionally based on one or more additional, non-deterministic factors, such as if a player tracking card is inserted in a gaming device and/or if a credit meter of a gaming device has a current balance greater than a designated balance.

In different embodiments, one or more additional statuses may be employed. For instance, a gaming device will be in a participating status if an individual player playing the gaming device is a premier player. In this embodiment, when a gaming device is in the participating status, the gaming system automatically treats the gaming device as an active gaming device for purposes of the other determinations including bonus event eligibility. It should be appreciated that a player's participating status could be determined at least in part based on the status of that player determined via a player tracking card or other player identification device used by that player in the gaming device. It should be appreciated that other criteria can be used to determine if a player is in the participating status.

In one embodiment, eligibility is determined differently for a first gaming device than for a second gaming device. In one such embodiment, a first one of a plurality of gaming devices becomes eligible based on the occurrence of a first eligibility event, such as a winning combination of primary game symbols. In this embodiment, a second one of the plurality of gaming devices becomes eligible based on the occurrence of a second eligibility event, such as a side wager on the communal game. In various embodiments, more than one of the plurality of gaming devices become eligible based on the same eligibility event, and one or more of the plurality of gaming devices become eligible based on a different eligibility event. In one embodiment, a plurality of eligibility events are available for each gaming device of the gaming system. In this embodiment, it is possible that a first gaming device becomes eligible for the bonus event based on the same eligibility event as a second gaming device. In this embodiment, it is also possible that the first gaming device becomes eligible for the bonus event based on a different eligibility event than the second gaming device.

In various embodiments, multiple occurrences of designated symbols or symbol combinations which trigger a bonus event enable the application of communal game symbols to the primary game of any eligible gaming device so as to generate larger bonus awards than an award resulting from a single occurrence of a designated symbol or symbol combination, enhancing the excitement and enjoyment of players playing the primary games of the plurality of gaming devices disclosed herein.

In one embodiment, when the communal game triggers a bonus event, eligible gaming devices of the disclosed gaming system may be provided an award for participation in the bonus event. In one embodiment, a triggered bonus event provides a designated bonus award to an eligible gaming device. In another embodiment, the disclosed gaming system provides a portion of a progressive award to one or more eligible gaming devices for participation in a bonus event. In one embodiment, the gaming system divides a total designated bonus award among one or more eligible gaming devices when a bonus event is triggered.

In one embodiment, when a play of the communal game triggers a bonus event, the gaming system provides an award to any eligible gaming devices based on one or more of the communal game symbols generated for a play of a communal game. In another embodiment, when a play of the communal game triggers a bonus event, the gaming system provides an award to any eligible gaming devices based on one or more primary game symbols generated for the eligible gaming devices. In one embodiment, the bonus award for any eligible gaming device is based, in part, on a wager placed at the gaming device. In one embodiment, the gaming system provides a bonus award upon the triggering of a bonus event based in part on one or more communal game symbols and based in part on the outcome of a primary game of one or more eligible gaming devices. In various embodiments, the gaming device provides a bonus award for any eligible gaming device for participation in a bonus event that is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, one or more symbols or gaming elements from the communal game are added to a plurality of symbols generated for a primary game of an eligible gaming device. For example, in one embodiment a primary game includes three reels. In this embodiment, one or more symbols or gaming elements from a communal game are inserted into the primary game as a fourth reel. In various embodiments, the gaming system or a player determines where the new reel should be inserted to maximize any new winning symbol combinations.

In one embodiment, one or more of the symbols or gaming elements of the communal game is a modifier symbol or element. In this embodiment, the gaming system enables one of the communal game modifiers to be applied to one or more winning symbol combinations generated by the primary game of one of the eligible gaming devices. For example, one or more of the plurality of communal game symbols may be a multiplier symbol such as a 5× multiplier symbol. In this embodiment, if the primary game of an eligible gaming device generates a winning symbol combination, the gaming system is configured to apply the multiplier symbol to the winning symbol combination to result in a bonus award that is five times as large as the primary game award. The 5× multiplier symbol used in the embodiment described is by way of example only; other modifiers which modify a primary game award are contemplated, such as modifiers that add a fixed amount to an award, modifiers that combine multiple awards resulting from a play of a bonus game, modifiers that provide a percentage of a progressive award, or any other suitable modifier.

In various embodiments, one or more combinations of designated communal symbols and designated communal symbol combinations further alter the way in which one or more symbols from the communal game are applied to one or more symbols from a primary game. In one embodiment, if more than one designated symbol is generated for a play of the communal game, the gaming system may replace a first set of primary game symbols with a first set of communal game symbols. The gaming system may then determine a first bonus award from this first replacement. Because more than one designated symbol was generated, the gaming system may then replace a second set of primary game symbols with a second set of communal game symbols and determine a second bonus award.

In one embodiment, the gaming system is configured such that the communal game does not play when each of the gaming machines of the gaming system is empty—that is, when no players are wagering on plays of the game of any of the gaming devices. In this embodiment, the communal game begins to play when a first player wagers on a play of the game of any of the gaming machines of the gaming system. In a further embodiment, the gaming system is contained within a bank of gaming machines, such that the communal game does not play unless a player is wagering on plays of the game of one of the gaming devices in the bank of gaming devices. In this embodiment, a play of the communal game is triggered by a wager at one of the gaming devices in the gaming system.

In a different embodiment, a play of the communal game is triggered by a wager on a play of the primary game of one of the gaming devices of the gaming system after a preceding play of the communal game has concluded. In this embodiment, if a player wagers on a play of the primary game of one of the gaming devices while a play of the communal game is still occurring (e.g., the reels of the communal game are still spinning), a second play of the communal game is not triggered. However, if a player wagers on a play of the primary game after a preceding play of the communal game has stopped (e.g., the reels of the communal game have ceased spinning), a second play of the communal game is triggered.

In different embodiments, the communal game is triggered based on a predetermined communal game trigger rate of the gaming system. In such embodiments, plays of the communal game are triggered based on the rate and regardless of wagers placed on plays of the primary games of the gaming devices. In various embodiments, the communal game trigger rate of the gaming system changes depending on the conditions of the gaming system. For example, the communal game trigger rate may be adjusted based on game play at the machines (i.e., a quantity of players playing at the gaming devices of the gaming system) or on the magnitude of wagers being placed (i.e., based on an average wager amount per play of the games of the gaming devices). In various embodiments, the communal game trigger rate is predetermined, randomly determined, determined based on player status of one or more players of the gaming devices of the gaming system (such as determined through a player tracking system), determined based on a random determination by the central controller, determined based on a random determination at one or more of the gaming devices, determined based on time (such as the time of day), determined based on an amount of coin-in accumulated in one or more pools, or determined based on any other suitable method or criteria.

In various alternative embodiments, the gaming system disclosed herein includes a bonus game implemented as a free spin communal game. In these embodiments, the gaming system continuously plays the free spin communal game, such that the gaming system continuously generates random symbols. The free spin communal game in these embodiments is configured to randomly generate an award for a spin of the game. In one such embodiment, the gaming system provides the generated award to each of any players at the gaming devices of the gaming system which were active at the time the award was generated. Thus, the gaming system is continuously making random determinations of whether to provide a random bonus award to a plurality of active players of the gaming devices of the gaming system.

In one embodiment, the gaming system provides an award determined for a play of the free spin bonus game to each of any active players by dividing a shared award among the players. In this embodiment, the portion of the shared award which the gaming system provides to each player is predetermined, randomly determined, determined based on the player's status (such as determined through a player tracking system), determined based on a random determination by the central controller, determined based on a random determination at the gaming machine, determined based on time (such as the time of day), determined based on an amount of coin-in accumulated in one or more pools or determined based on any other suitable method or criteria. In various alternative embodiments, the gaming system provides an equal award determined by a play of the free spin bonus game to each of any active players at the time the free spin bonus game indicates such an award. It should be appreciated that in various such embodiments, the rate at which the gaming system plays the free spin bonus game varies depending on the amount of players wagering on plays of the primary games of the gaming devices, the magnitude of the wagers on such plays of the primary games, or any other suitable factors.

In one embodiment, each play of the communal game disclosed herein triggers the bonus event. In this embodiment, the communal game is configured, for each play of the communal game, to generate at least one symbol for use in the bonus event. The communal game generates the at least one symbol for use in the bonus event from a pool of symbols including operative symbols and blank symbols. In this embodiment, if one or more blank symbols is indicated for a play of the communal game, the bonus event is triggered but no action is taken in the bonus event because a blank symbol was generated. Similarly, if one or more operative symbols are generated, the bonus event is triggered and the gaming system applies the one or more operative symbols to a preceding primary game outcome of any eligible gaming devices of the gaming system. It should be appreciated that in various further embodiments, a gaming device of the gaming system is eligible for participation in the bonus event simply by playing the primary game. Thus, in one embodiment, if a player wagers on a play of the primary game of a gaming device, and if the communal game indicates an operative symbol, the gaming system applies the operative symbol the play of the primary game.

In various embodiments, the frequency with which the gaming system plays the communal game varies based on the time (such as time of day), wager levels by players at gaming devices of the gaming system, the generation of various designated primary game outcomes, or combinations thereof. In different embodiments, the frequency with which the gaming system plays the communal game is predetermined, randomly determined, determined based on the player's status (such as determined through a player tracking system), determined based on a random determination by the central controller, determined based on a random determination at the gaming machine, determined based on an amount of coin-in accumulated in one or more pools or determined based on any other suitable method or criteria.

In various of the above-described embodiments, the gaming system is configured to increase player excitement and enjoyment by displaying at least one counter or indicator including a representation of the passage of time since the communal game last triggered a bonus event. In one such embodiment, the counter or indicator indicates a passage of time (i.e., a quantity of seconds, minutes, or hours). In another such embodiment, the counter or indicator indicates a quantity of plays of the primary game since the last triggered bonus event. In still another such embodiment, the counter or indicator indicates an amount of coin-in since the last triggered bonus event.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming devices, each gaming device including:

a housing, at least one display device supported by the housing, a plurality of input devices supported by the housing, said plurality of input devices including:

(i) an acceptor, (ii) a validator, and (iii) a cashout device, at least one processor, and at least one memory device which stores a plurality of instructions, which when executed by the at least one processor, cause the at least one processor to operate with the at least one display device and the plurality of input devices to:

(a) if a physical item is received via the acceptor:

(i) identify, via the validator, the received physical item, and (ii) establish a credit balance based, at least in part, on a monetary value associated with the received and identified physical item, (b) receive, via at least one of the plurality of input devices, a wager placed on a play of a primary game, said placed wager causes a decrease of the credit balance, (c) determine, via the at least one processor, a primary game symbol from a plurality of primary game symbols in each of a plurality of primary game symbol positions, (d) display, via the at least one display device, the determined primary game symbol in each of the plurality of primary game symbol positions, (e) display any primary game award for any determined winning combination of said primary game symbols, and (f) if a cashout input is received via the cashout device, cause an initiation of a payout associated with the credit balance; and a controller programmed to operate with the plurality of gaming devices to:

(i) determine and cause a display of at least one communal game symbol from a plurality of communal game symbols for a play of a communal game, wherein said determination and display of the at least one communal game symbol occurs:

(A) regardless of any placement of any wagers on any plays of any primary games of any of the gaming devices, and (B) regardless of any plays of any primary games of any of the gaming devices, (ii) determine whether a bonus event is triggered, wherein said determination is based on at least one event occurring in association with the play of the communal game, (iii) if the bonus event is triggered:

(A) determine a bonus event eligibility for each of the plurality of gaming devices and (B) cause each eligible gaming device to display and provide a bonus award, and (iv) if the bonus event is not triggered, repeat (i) to (iv) at least once.

2. The gaming system of claim 1, wherein for each gaming device, the central controller is programmed to determine said bonus event eligibility based, at least in part, on at least one of: a side wager on said play of the communal game and any determined winning combination of said primary game symbols for said gaming device.

3. The gaming system of claim 1, wherein, for a first gaming device, the central controller is programmed to determine said bonus event eligibility differently than for a second gaming device.

4. The gaming system of claim 1, wherein said plurality of communal game symbols includes at least one designated symbol, and wherein said central controller is programmed to determine whether the bonus event is triggered based, at least in part, on whether said at least one designated communal game symbol is determined.

5. The gaming system of claim 4, wherein for each eligible gaming device, said bonus award is based, at least in part, on a quantity of determined designated communal game symbols.

6. The gaming system of claim 1, wherein for each eligible gaming device, said central controller is programmed to determine whether the bonus event is triggered based, at least in part, on whether the at least one determined communal game symbol forms a designated communal game symbol combination.

7. The gaming system of claim 1, wherein for each eligible gaming device, said bonus award is based, at least in part, on at least one of: the at least one determined communal game symbol, at least one of the determined primary game symbols for said eligible gaming device, and any primary game award for said eligible gaming device.

8. A gaming system comprising:

a plurality of gaming devices, each gaming device including:

a housing, at least one display device supported by the housing, a plurality of input devices supported by the housing, said plurality of input devices including:

(i) an acceptor, (ii) a validator, and (iii) a cashout device, at least one processor, and at least one memory device which stores a plurality of instructions, which when executed by the at least one processor, cause the at least one processor to operate with the at least one display device and the plurality of input devices to:

(a) if a physical item is received via the acceptor:

(i) identify, via the validator, the received physical item, and (ii) establish a credit balance based, at least in part, on a monetary value associated with the received and identified physical item, (b) receive, via at least one of the plurality of input devices, a wager placed on a play of a primary game, said placed wager causes a decrease of the credit balance, (c) determine, via the at least one processor, a primary game outcome for the play of the primary game, (d) display, via the at least one display device, the determined primary game outcome, (e) display any primary game award associated with the determined primary game outcome, and (f) if a cashout input is received via the cashout device, cause an initiation of a payout associated with the credit balance; and a controller programmed to operate with the plurality of gaming devices to:

(i) determine and cause a display of at least one communal game symbol from a plurality of communal game symbols for a play of a communal game, wherein said determination and display of the at least one communal game symbol occurs:

(A) regardless of any placement of any wagers on any plays of any primary games of any of the gaming devices, and (B) regardless of any plays of any primary games of any of the gaming devices, (ii) if at least one bonus triggering event occurs in association with the play of the communal game, for each gaming device:

(A) determine a bonus event eligibility of said gaming device, and (B) if said gaming device is eligible:

(1) modify the determined primary game outcome of said gaming device, said modification based on the at least one determined communal game symbol, (2) determine a bonus award for said gaming device, said bonus award associated with the modified primary game outcome of said gaming device, and (3) cause said gaming device to display and provide the determined bonus award, and (iii) if at least one bonus triggering event does not occur in association with the play of the communal game, repeat (i) to (iii) at least once.

9. The gaming system of claim 8, wherein for each gaming device, said central controller is programmed to determine said bonus event eligibility based, at least in part, on at least one of: a side wager on said play of the communal game and the determined primary game outcome.

10. The gaming system of claim 8, wherein, for a first gaming device, said central controller is programmed to determine said bonus event eligibility differently than said for a second gaming device.

11. The gaming system of claim 8, wherein said central controller is configured to determine at least one communal game symbol based, at least in part, on a quantity of players wagering on plays of the primary games of the plurality of gaming devices.

12. The gaming system of claim 8, wherein for each eligible gaming device, said bonus award is based, at least in part, on a quantity of determined designated communal game symbols.

13. The gaming system of claim 8, wherein for each eligible gaming device, said central controller is programmed to modify the primary game outcome of said eligible gaming device by replacing at least one of the determined primary game symbols with the at least one determined communal game symbol.

14. The gaming system of claim 8, wherein for each eligible gaming device, said central controller is programmed to modify the primary game outcome of said eligible gaming device by adding at least one of the determined communal game symbol to the determined primary game symbols.

15. The gaming system of claim 8, wherein said central controller is programmed to modify the primary game outcome of a first eligible gaming device differently than any modification of the primary game outcome of a second gaming device.

16. The gaming system of claim 8, wherein for each eligible gaming device, said bonus award is based, at least in part, on any primary game award for said eligible gaming device.

17. The gaming system of claim 8, wherein the controller is programmed to determine whether the at least one bonus triggering event occurs in association with the play of the communal game before at least one of the plurality of the gaming devices:

(a) determines and displays a primary game outcome for the play of the primary game, and (b) displays and provides any primary game award associated with the determined primary game.

18. The gaming system of claim 8, wherein the controller is programmed to determine whether the at least one bonus triggering event occurs in association with the play of the communal game after at least one of the plurality of the gaming devices:

(a) determines and displays a primary game outcome for the play of the primary game, and (b) displays and provides any primary game award associated with the determined primary game.

* * * * *